(12) United States Patent
Nakayama et al.

(10) Patent No.: US 6,452,887 B2
(45) Date of Patent: *Sep. 17, 2002

(54) DISK DRIVE

(75) Inventors: Tatsuyuki Nakayama; Sunao Aoki, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/800,857

(22) Filed: Mar. 7, 2001

Related U.S. Application Data

(62) Division of application No. 09/136,313, filed on Aug. 19, 1998, now Pat. No. 6,275,460.

Foreign Application Priority Data

Aug. 20, 1997 (JP) .............................................. 9-223444
Aug. 20, 1997 (JP) .............................................. 9-223445
Aug. 20, 1997 (JP) .............................................. 9-223446

(51) Int. Cl.[7] .............................................. G11B 33/02
(52) U.S. Cl. .................................................. 369/75.2
(58) Field of Search ............................... 369/75.2, 75.1, 369/77.1, 77.2, 219; 360/99.02, 99.06

(56) References Cited

U.S. PATENT DOCUMENTS 5,544,146 A  * 8/1996 Luffel et al. ................. 369/178
5,636,198 A  * 6/1997 Maeng ........................ 369/191
6,044,057 A  * 3/2000 Park et al. ................... 369/219

* cited by examiner

Primary Examiner—David Hudspeth
Assistant Examiner—Angel Castro
(74) Attorney, Agent, or Firm—Jay H. Maioli

(57) ABSTRACT

A disk drive including a turntable for holding and rotating a disk, a pickup for reading information carried by a signal and/or recording information carried by a signal to the disk by moving the pickup in a radial direction of the disk that is held and rotated by the turntable, and a feed motor for moving the pickup. A drive gear section, which engages a rack of the pickup, is integrally formed with a rotor of a sled motor. An axis of rotation of the sled motor is disposed parallel to an axis of rotation of the turntable. The disk drive makes it possible to perform seeking operations at a high speed, to reduce errors in movement of the pickup, and to achieve size reduction.

3 Claims, 28 Drawing Sheets

DISK DRIVE

This is a division of prior application Ser. No. 09/136,313 filed Aug. 19, 1998 is now U.S. Pat. No. 6,275,460.

BACKGROUND OF THE INVENTION

1. Field of the Invention

The present invention relates to a novel disk drive. More specifically, the present invention relates to a technique which allows high-speed seek operations, a reduction in pickup movement errors, and size reduction.

2. Description of the Related Art

There have been conventionally used two types of mechanisms for moving a pickup which performs reading of information from and/or recording of information to a disk. They are the rack-and-pinion mechanism in which a rack gear of a pickup is moved forwardly by means of a pinion gear, and the lead screw mechanism in which a nut member of a pickup is moved forwardly by means of a lead screw.

In the rack-and-pinion mechanism, the rotation of the motor is slowed down and transmitted, through a plurality of reduction gears, to the pinion gear which engages the rack gear of the pickup.

This, however, causes the seek time of the pickup to be lengthened.

In addition, in the rack-and-pinion mechanism, a plurality of reduction gears are interposed between the motor and the pinion gear, so that the total backlash between the gears is increased, resulting in a larger error in movement of the pickup with respect to the number of rotations of the motor.

When an attempt is made to eliminate backlash, which causes errors in the movement of the pickup, between the gears, a mechanism for eliminating the backlash is required, so that more parts are required, the number of manhours required for assembly is increased, costs are increased, and the disk drive becomes larger.

In the lead screw mechanism, the amount of movement of the motor with respect to the number of rotations of the motor is small, so that, here again, the seek time is lengthened. In addition, the disk drive becomes thicker.

In a disk drive used for writing information to or reading recorded information from a disk, information is written or read by moving a pickup in a radial direction of the disk. In order to write and read information to and from the disk, it is necessary to accurately irradiate, for example, laser beams, emitted from the pickup, perpendicular to or at a specified angle from an information recording surface of the disk.

In such a disk drive, in order to allow the pickup to move freely from the inner periphery to the outer periphery of the disk, the pickup is guided using two guide shafts, and is moved as a result of transmitting driving power of a motor, or the like, to the pickup.

In conventional disk drives, the two guide shafts, used for guiding the pickup, as well as the spindle motor, used for rotating the turntable that holds and allows rotation of the disk, are mounted to the chassis.

For this reason, the degree of parallelism between the two guide shafts and the mounting portion of the stator base that supports the spindle motor is greatly affected by the degree of flatness and the dimensional precision of the chassis. When the degree of flatness or the dimensional precision of the chassis is reduced, the degree of parallelism between the guide shafts and the stator base is also reduced, causing, for example, laser beams from the pickup to strike the information recording surface of the disk obliquely rather than vertically (angle from the vertical will hereinafter be referred to as "skew angle"). When the skew angle becomes large, the performance of the disk drive is greatly reduced.

In order to maintain the performance capabilities of the disk drive, it is necessary to keep the skew angle close to zero by making the chassis as flat as possible and its dimensions as precise as possible. Therefore, it becomes difficult to produce the chassis, chassis yield and thus disk drive yield are reduced, thus making it difficult to produce disk drives in large quantities, and increasing costs.

SUMMARY OF THE INVENTION

Accordingly, it is an object of the present invention to make it possible to perform high-speed seeking operation, to reduce the amount of error in the movement of the pickup, and to achieve size reduction.

It is another object of the present invention to make it possible to easily perform skew angle adjustment.

To this end, according to the present invention, there is provided a disk drive in which a drive gear section which engages a rack of a pickup is formed integrally with a rotor of a sled motor, and a rotary shaft of the sled motor is provided parallel to a rotary shaft of a turntable that holds and rotates a disk that serves as a recording medium.

Accordingly, in the disk drive of the present invention, the rotation of the sled motor is transmitted directly to the rack of the pickup.

In addition, according to the present invention, there is provided a disk drive comprising a pickup for reading information carried by a signal from and/or recording information carried by a signal to a disk by moving the pickup in a radial direction of the disk that is held and rotated by a turntable; and two guide shafts for allowing the pickup to be guided; wherein one end of at least one of the two guide shafts is fixed and the other end serves as an adjustment end, with the position of the other end being adjustable in a direction which allows the other end to come into contact with and separate from the disk.

Therefore, the disk drive of the present invention allows adjustment of the orientation of the pickup with respect to an information recording surface of the disk after manufacture, that is allows the disk drive of the present invention to perform skew adjustment.

DESCRIPTION OF THE PREFERRED EMBODIMENTS

A description will now be given of embodiments of a disk drive of the present invention, with reference to the attached drawings. It is to be noted that in the embodiments of the present invention a CD-ROM drive, which is mounted to a notebook personal computer, is taken as an example.

Figure 1:
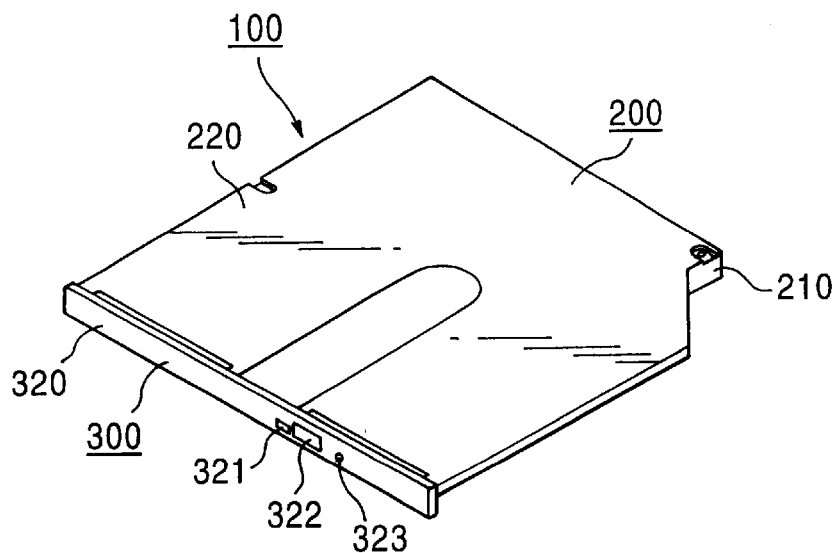
FIG. 1 is a perspective view of an embodiment of an entire disk drive in accordance with the present invention, with the tray being in a housed state.
Figure 2:
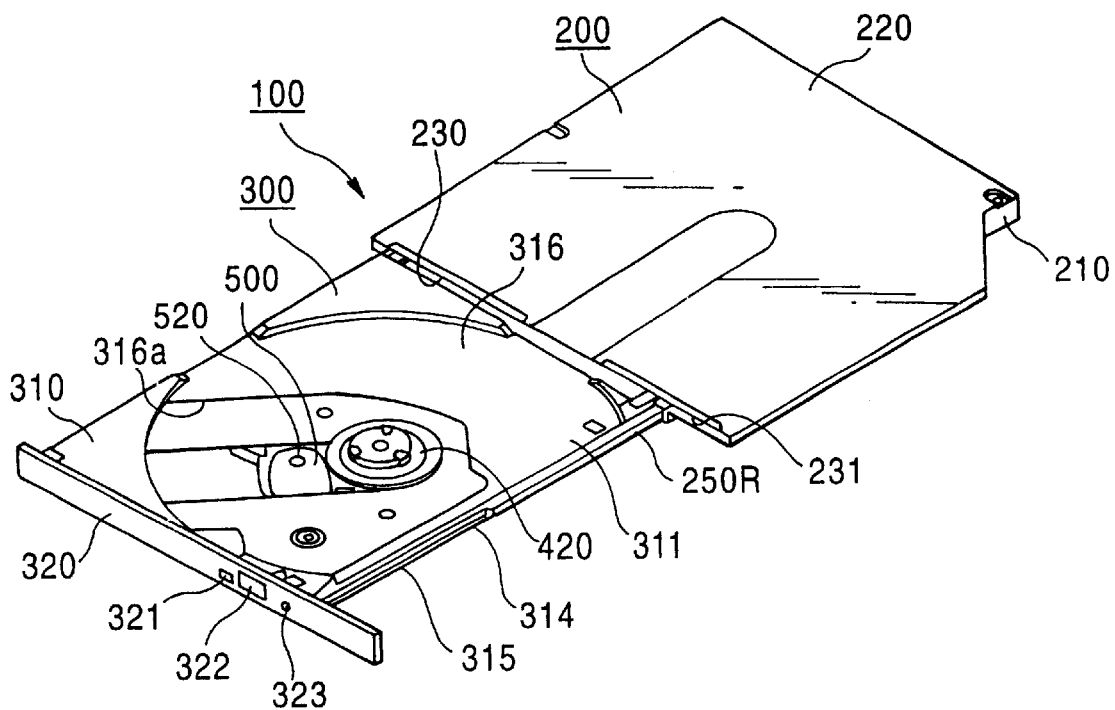
FIG. 2 is a perspective view of the entire disk drive, with the tray being in a drawn-out state.
Figure 3:
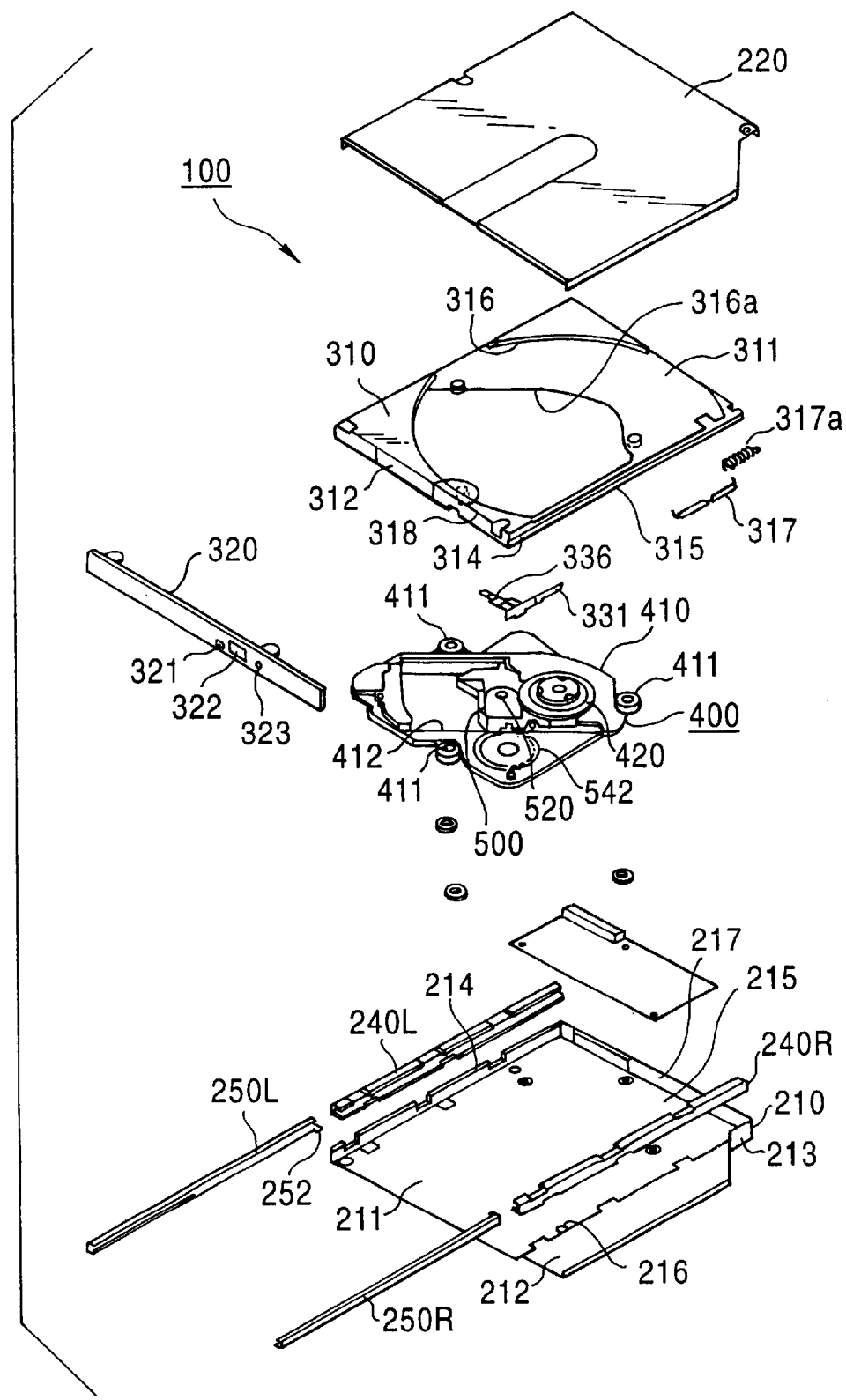
FIG. 3 is an exploded perspective view of the entire disk drive.

As shown in FIGS. 1 to 3, the CD-ROM drive 100 includes an outside housing 200 which is flat in the vertical direction and has an opening formed throughout the entire surface.

The outside housing 200 includes a bottom chassis 210 and a cover member 200 affixed to the top surface of the bottom chassis 210. The bottom chassis 210 is made of a sheet metal, and a protruding section 212 is integrally formed so as to protrude towards the right from a portion of a main face 211 not including the rear end of the right upper edge. The main face 211 has a recess which opens at the top and front sides. (In the specification, in FIG. 1, the left downward direction is defined as the forward direction, the right upward direction as the rearward direction, the left upward direction as the leftward direction, the right downward direction as the rightward direction, the upward direction as the upward direction, and the downward direction as the downward direction.) A right face section 213, which protrudes slightly upward, is formed at the right end of the protruding section 212, with the top edge of the right face section 213 and the top edge of a left face section 214 of the main face 211 being positioned at the same height. An engaging protrusion 216, which protrudes upward, is formed towards the front side of the right edge of the bottom surface 215 of the main face 211, with a front face 216a of the engaging protrusion 216 being an inclined face which inclines downward and towards the front, and a rear face 216b being an engaging face (see FIG. 12).

The aforementioned cover member 220 is made of a sheet metal and formed into a substantially flat shape, and is affixed to the top surface of the bottom chassis 210 so as to cover it, whereby an opening is formed at the front side, so that a main space 230, for accommodating a drawer section to be described later, and a disk auxiliary space 231, which extends towards the right and continuously from the upper end of the right edge of the main space 230, are formed.

Figure 4:
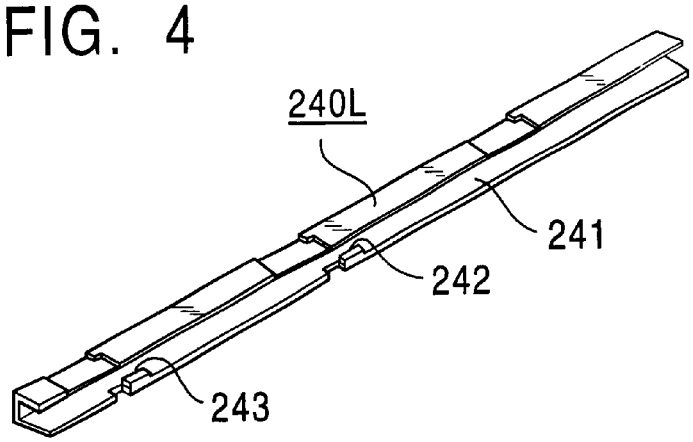
FIG. 4 is a perspective view of the left guide member.

A guide member 240L (shown in FIG. 4) and a guide member 240R are affixed at the left and right sides, respectively, of the main space 230. The guide members 240L and 240R are symmetrically formed of synthetic resin on the left and right sides and are U-shaped in transverse cross section, and are affixed to the bottom chassis 210 so that their open sides face each other. Stoppers 242, which protrude slightly upward, are formed at about the middle, in the forward-and-backward direction, of an edge of the opening at each of bottom sides 241 of the guide members 240L and 240R, respectively. (These guide members 240L and 240R are formed symmetrically on the left and right sides, so that only the left guide member 240L is shown in detail.) In addition, dislodging preventing sections 243, which protrude slightly upward, are formed towards the front side of the edge of the opening at their corresponding bottom sides 241.

Figure 5:
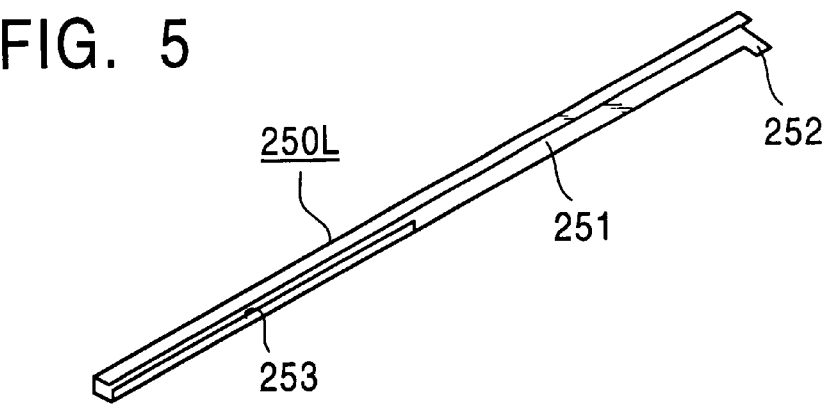
FIG. 5 is a perspective view of the left rail member.
Figure 6:
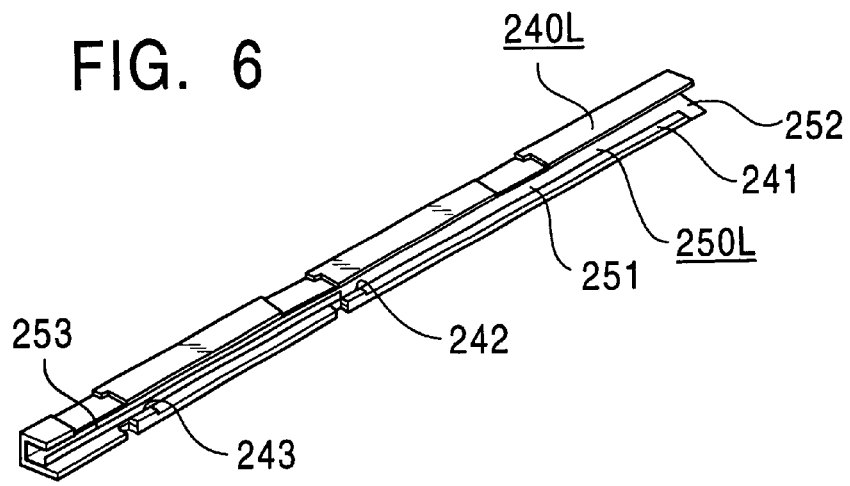
FIG. 6 is a perspective view of the left guide member and the left rail member combined together, when the tray is in the housed state.
Figure 7:
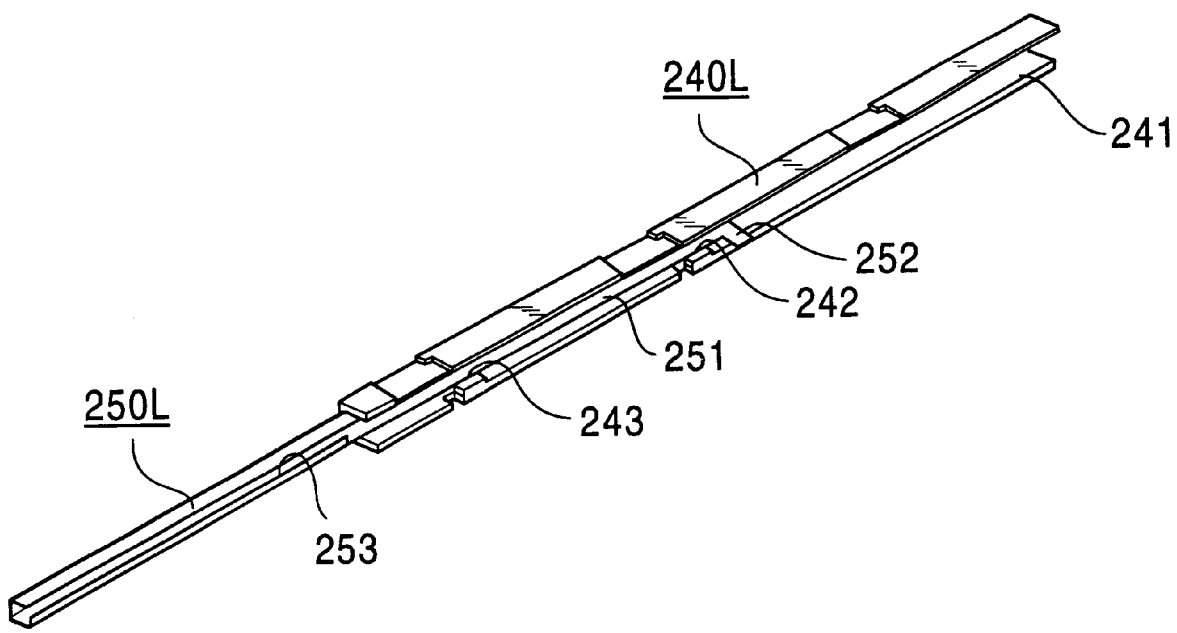
FIG. 7 is a perspective view of the left guide member and the left rail member combined together, when the tray is in the drawn-out state.

A rail member 250L (shown in FIG. 5) and a rail member 250R are slidably supported, in the forward-and-backward direction, by the guide members 240L and 240R, respectively. The rail members 250L and 250R are symmetrically formed on the left and right sides by bending a sheet metal so that they are U-shaped in transverse section. These rail members 250L and 250R are slidably supported, in the forward-and-backward direction, by the guide members 240L and 240R, respectively, so that their open sides face each other. In other words, the rail member 250L, as shown in FIGS. 6 and 7, is slidably supported by the guide member 240L, whereas the rail member 250R is slidably supported by the guide member 240R. The stoppers 242 of the guide members 240L and 240R as well as the dislodging preventing sections 243 slidably contact an edge of the opening at the bottom sides 251 of the rail members 250L and 250R, whereby the rail members 250L and 250R are prevented from being dislodged from the guide members 240L and 240R, respectively.

Stoppers 252, which protrude towards each other, are formed at the rear end of their respective bottom sides 251 of the rail member 250L (shown in FIG. 5) and the rail member 250R. (These rail members 250L and 250R are symmetrically formed on the left and right sides, so that only the left rail member 250L is shown in detail.) Engagement of the stoppers 252 with the stoppers 242 of the guide members 240L and 240R from behind their respective stoppers 242 prevents further forward movement of the stoppers 252. In other words, dislodging from the guide members 240L and 240R in the forward direction is prevented.

In addition, dislodging preventing edges 253 of small height, which protrude upward, are formed so as to extend along an edge of the opening at each of the bottom sides 251 of the rail members 250L and 250R, from a portion thereof located slightly towards the front from the center to the front end of the rail members 250L and 250R, in the forward-and-backward direction.

The drawer section 300 is supported by the aforementioned outside housing 200 so that it can be housed in and drawn out from the outside housing 200. The drawer section 300 is formed by making a tray 310, made of synthetic resin, support a base unit to be described later.

Figure 8:
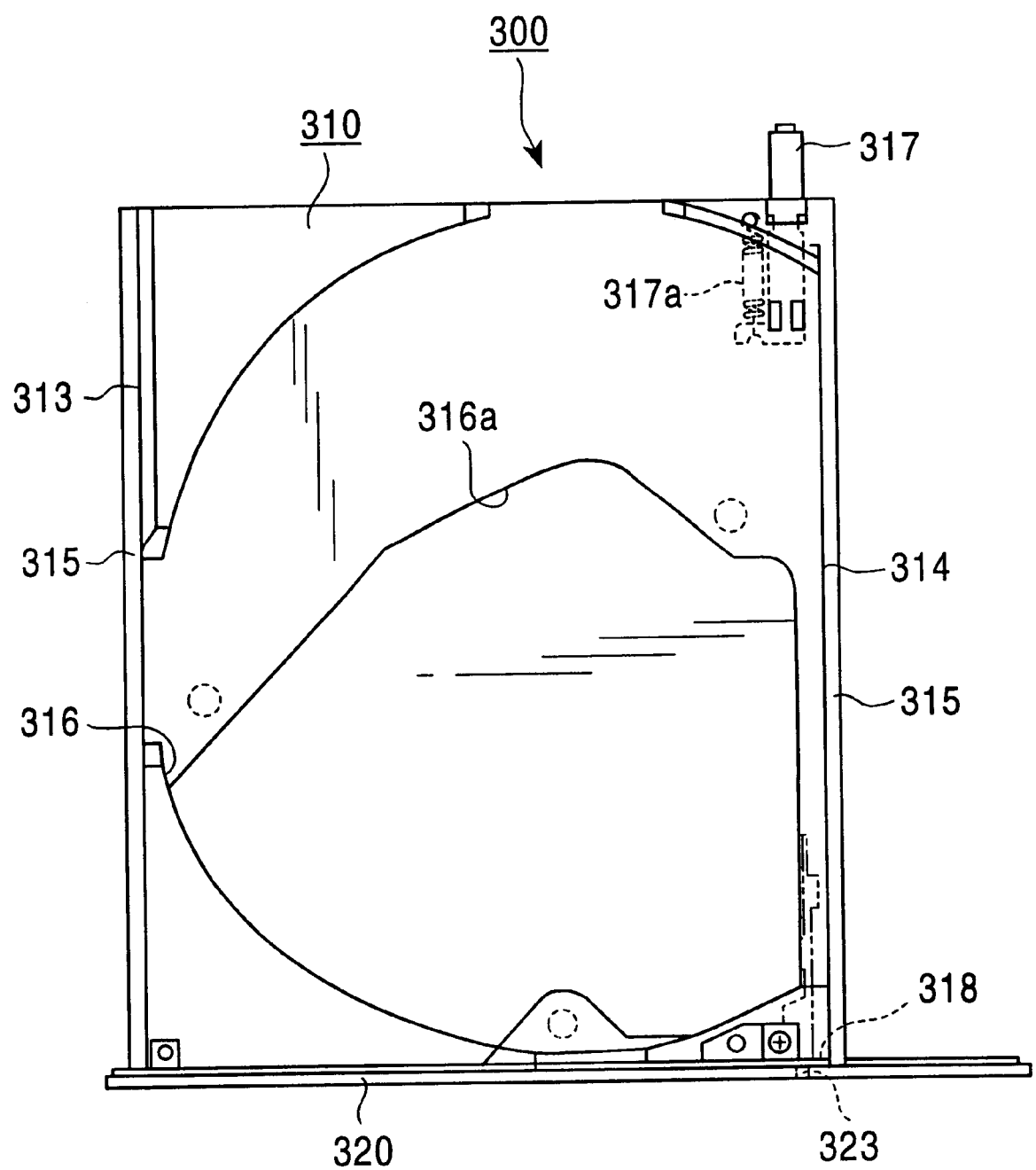
FIG. 8 is a plan view of a drawer.

As shown in FIG. 8, the tray 310 has a planar shape and an external shape which is a long rectangle in the forward-and-backward direction. Its width is slightly smaller than the width of the main space 230 in the outside housing 200.

The tray 310 has a main face 311, which has a planar shape and a long rectangular shape in the forward-and-backward direction, a front wall 312, which is formed vertically at the front edge of the main face 311, left and right walls 313 and 314, which are formed vertically on the left and right edges of the main face 311, and sliding sections 315, which are formed outwardly of the left and right walls 313 and 314. All of these parts are integrally formed of synthetic resin. A recess 316, whose edge forms part of a circle for placing on the top surface thereof a CD-ROM, is formed in the main face, and an opening 316a is formed in the recess 316 to allow the base unit to be described later to face upward.

Figure 9:
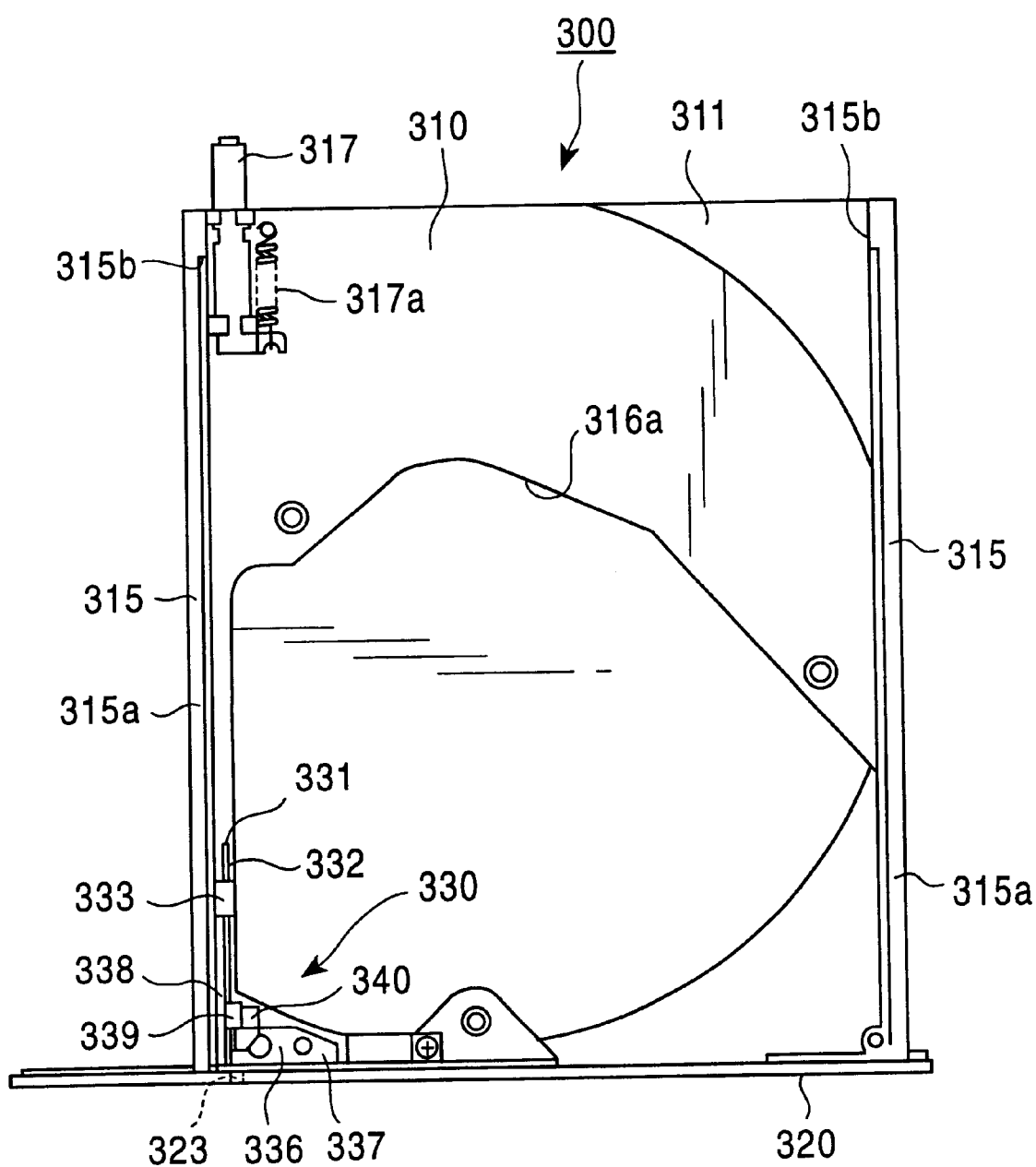
FIG. 9 is a bottom view of the drawer.
Figure 10:
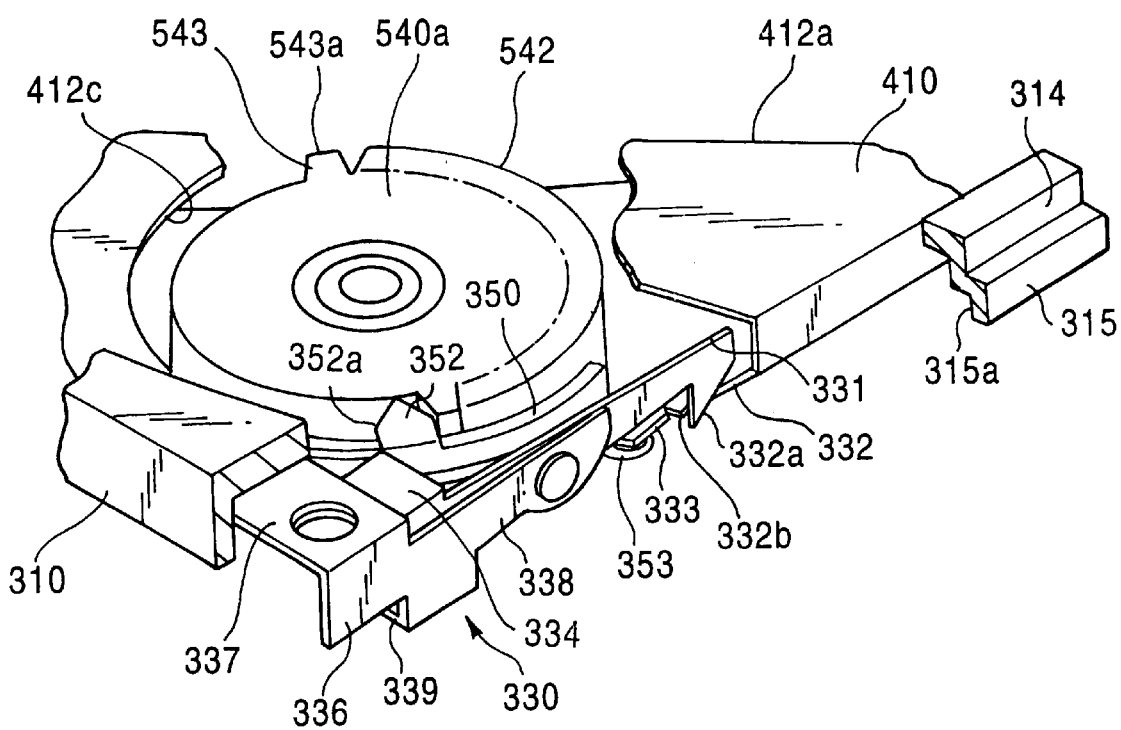
FIG. 10 is a perspective view of a lock mechanism and the members related thereto.

The sliding sections 315, which are square-shaped in transverse section and extend in the forward-and-backward direction, protrude from the outer surface of the left and right walls 313 and 314, respectively, of the tray 310. The top edges of the slide sections 315, respectively, are located at a lower height than the top edges of the side walls 313 and 314 of the tray 310. In addition, lower edges 315a protrude slightly downwardly from the side walls 313 and 314 of the tray 310. As shown in FIG. 9, stopper protrusions 315b, which slightly protrude inwardly, are formed at the rear end of each of the sliding sections 315. The sliding sections 315 are slidably supported by the rail members 250L and 250R. The dislodging preventing edges 253 of the rail members 250L and 250R slidably contact the inside side surface of the lower edges 315a of the sliding sections 315, thereby preventing the sliding sections 315 from becoming dislodged from the rail members 250L and 250R, in the direction of the openings of their respective rail members 250L and 250R. When the tray 310 moves towards the front with respect to the rail members 250L and 250R, the stopper protrusions 315b of the sliding sections 315 come into contact with the back ends of the dislodging preventing edges 253 of the rail members 250L and 250R, thereby preventing further forward movement of the tray 310 with respect to the rail members 250L and 250R.

Accordingly, with the tray 310 supported in such a manner that it can be accommodated in and drawn out from the outside housing 200, the top side of the recess 316 is positioned at about the same height as the top surface of the protrusion 212 of the outside housing 200.

As shown in FIG. 9, an ejector 317, which is supported so as to be movable in the forward-and-backward direction, is provided at the bottom surface, at the right side of the rear end of the main face 311 of the tray 310. The ejector 317, which is formed of a sheet metal, is a long plate extending in the forward-and-backward direction, and an extension coil spring 317a, which is stretched tightly between the ejector 317 and the main face 311, produces a moving force that biases the ejector 317 in such a manner that the rear end thereof stops when it protrudes rearwardly from the rear edge of the main face 311 by a certain amount.

A front panel 320 is mounted to the front face of the tray 310. The front panel 320, made of synthetic resin, is a horizontal long plate, whose length in the horizontal direction is about the same as the length, in the horizontal direction, of the outside housing 200. The front panel 320 is affixed to the front face of the tray 310, with its left end substantially aligned with the left end of the tray 310. An indicator section 321, for indicating the state of a CD-ROM drive 1, and an eject button 322 are provided at the front panel 320. Pressing the eject button 322 causes an eject operation to be described later to be performed. An emergency receiving hole 318 is formed at the right end of the front wall 312 of the tray 310, and a receiving hole 323 is formed in a location of the front panel 320 corresponding to the location of the emergency receiving hole 318.

A lock mechanism 330, which locks the drawer section 300 to keep it mounted in the outside housing 200, is provided. A description will now be given of the lock mechanism 330 with reference to FIGS. 10 to 15.

A lock arm 331 is disposed at a portion of the lower surface of the main face 311 of the tray 310 located at the right side and towards the front end of the main face 311. (Refer to FIG. 9.) The lock arm 331 is formed by bending a sheet metal, is substantially a long plate in the forward-and-backward direction, and has an engaging pawl 332 at the back end thereof. The engaging pawl 332 has an inclined edge 332a that inclines upward towards the back, and an engaging edge 332b that is formed continuously with the front end of the inclined edge 332a and extends directly upward therefrom. A push portion 333, which bends to the right, is formed at a portion of the bottom edge of the lock arm 331 located slightly forwardly of the engaging pawl 332. A spring contact portion 334, which protrudes towards the left from the top edge of the front side of the lock arm 331, is provided, and a protruding emergency pushing portion 335, which inclines forwardly and downwardly from the front edge of the spring contact portion 334, is provided. (Refer to FIG. 12.)

A lock arm mounting plate 336 is affixed to a portion of the bottom surface of the main face 311 of the tray 310 located towards the front end of the right side of the main face 311. As seen from the front, the lock arm mounting plate 336 looks like an inverted L shape, and the top edge of the front side portion of a supporting section 338, which extends along the inside surface of the right wall 314, is formed continuously with the right side edge of a mounting section 337 that is affixed to the lower surface of the main face 311 of the tray 310. A spring supporting portion 339, which protrudes towards the left, is formed at a portion of the bottom edge of the supporting section 338 located slightly rearwardly from the front end, and a spring externally fitting section 339a is formed so as to protrude upwardly from the left side edge of the spring supporting portion 339. (Refer to FIGS. 12, 13, and 14.)

The portion of the lock arm 331 located slightly forwardly from the center, in the forward-and-backward direction thereof, is rotatably supported at about the center in the forward-and-backward direction of the supporting section 338, with the spring contact portion 334 thereof being disposed so as to face the spring supporting portion 339 of the lock arm mounting plate 336. A compressive coil spring 340 is interposed between the spring contact portion 334 and the spring supporting portion 339, and produces a rotational force that biases the rear end of the lock arm 331 downward. It is to be noted that the compressive coil spring 340 is fitted to the spring externally fitting section 339a in order to prevent it from being dislodged therefrom.

With the drawer section 300 being maximally drawn out from the outside housing 200, the stoppers 252 of the rail members 250L and 250R, respectively, engage the back end of the stoppers 242 of the guide members 240L and 240R, and the stopper protrusions 315b of the drawer section 300 engage the rear ends of the dislodging preventing edges 253 of the rail members 250L and 250R. In this case, the rear end of the tray 310 is drawn out from the outside housing 200 (see FIGS. 2 and 7). The tray 310, in this state, is said to be at a "drawn-out position."

As the drawer section 300, in the drawn-out state, is pushed into the outside housing 200, the sliding sections 315 slide backwards with respect to the rail members 250L and 250R, and, eventually, the back surface of the front panel 320 comes into contact with the front ends of the rail members 250L and 250R. As the drawer section 300 is further pushed into the outside housing 200, the rail members 250L and 250R, along with the drawer section 300, slide backward with respect to the guide members 240L and 240R and stop sliding, whereby the tray 310 is completely housed in the outside housing 200 (see FIGS. 1 and 6). The tray 310, in this state, is said to be at a housed position.

Figure 12:
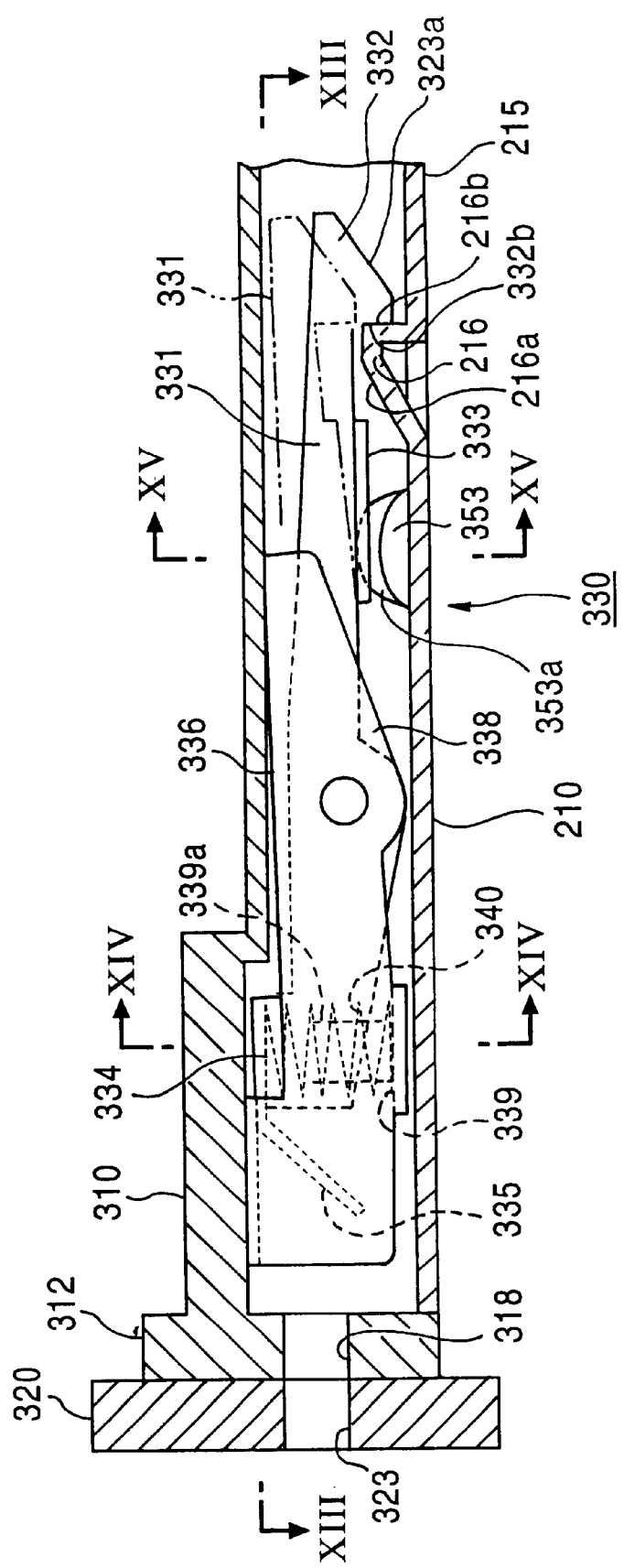
FIG. 12 is a side view of the lock mechanism.
Figure 13:
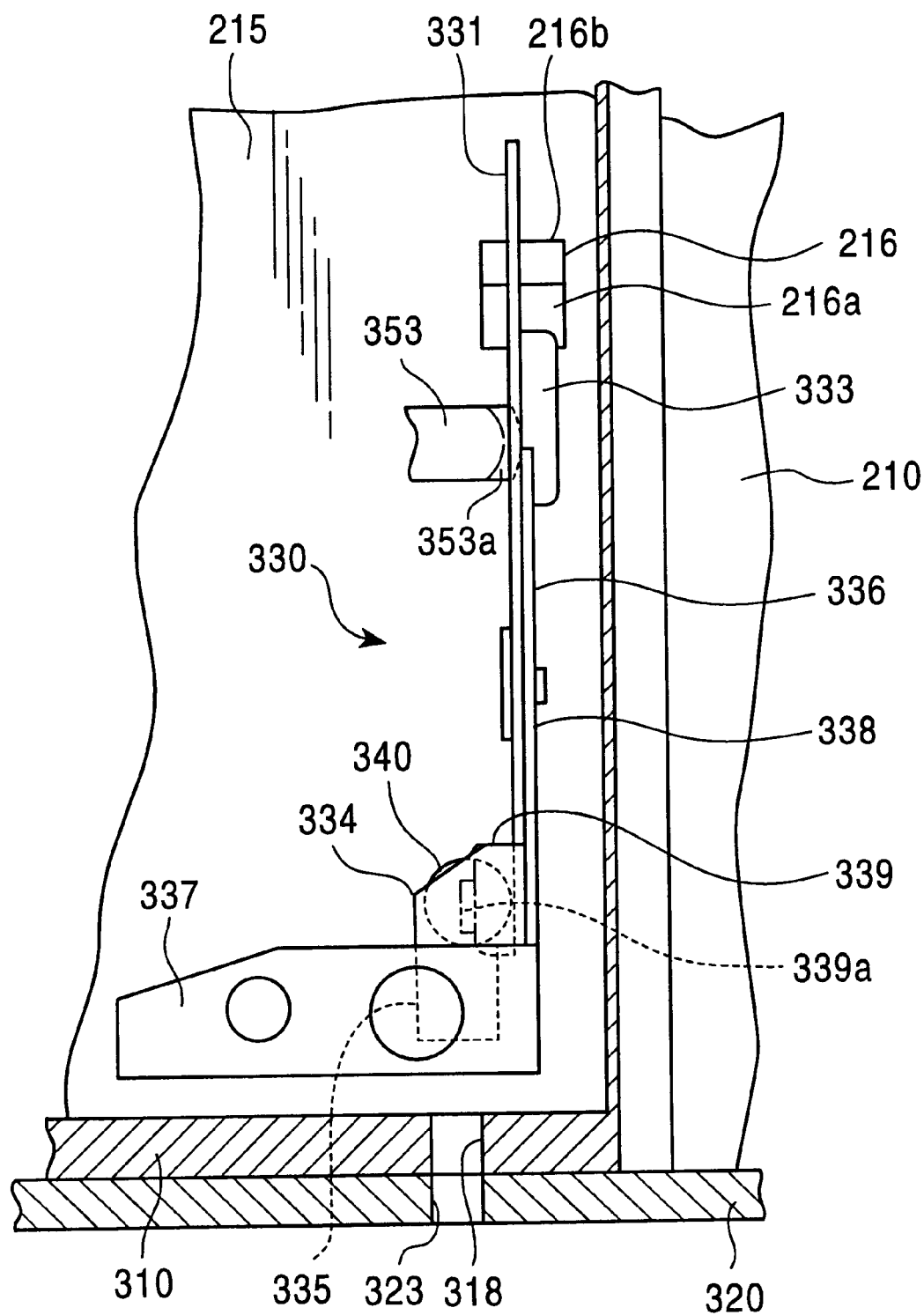
FIG. 13 is a sectional view taken along line XIII—XIII of FIG. 12.
Figure 14:
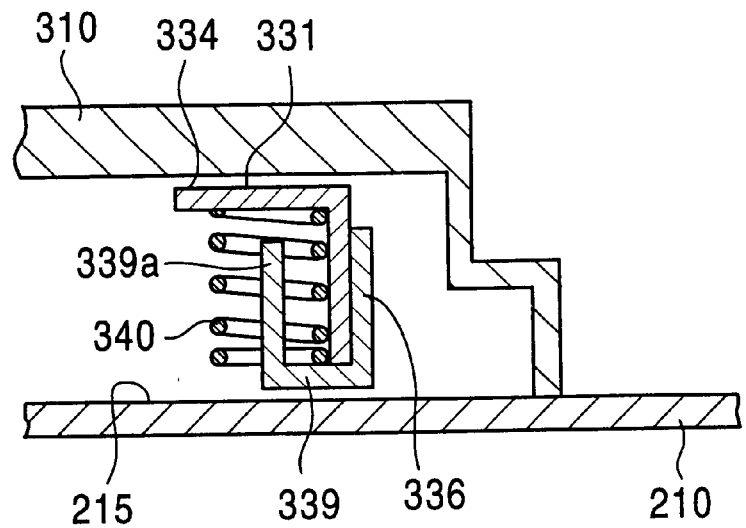
FIG. 14 is a sectional view taken along line XIV—XIV of FIG. 12.
Figure 15:
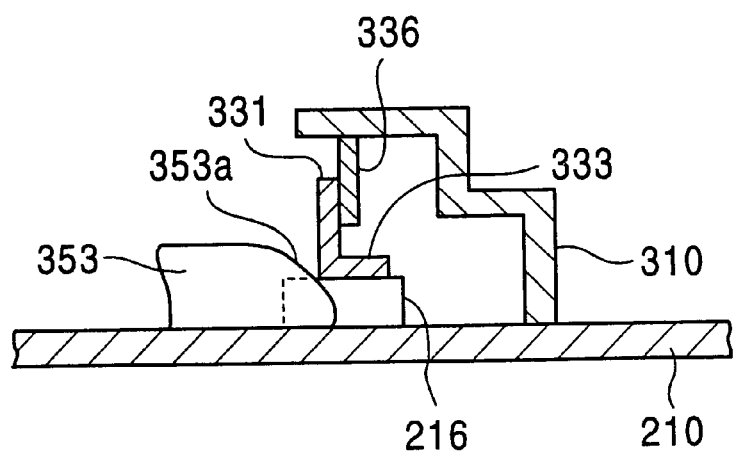
FIG. 15 is a sectional view taken along line XV—XV of FIG. 12.

Just before the tray 310 reaches the housed position of FIG. 1, the inclined edge 332a of the engaging pawl 332 of the lock arm 331 slides along the inclined surface 216a of the engaging protrusion 216 of the outside housing 200, and opposes the resilient force of the compressive coil spring 340, so that the rear end of the lock arm 331 rotates upward to the location indicated by alternate long and two short dash lines, in FIG. 12, and the engaging pawl 332 moves to the back side of the engaging protrusion 216. The rear end of the engaging pawl 332 rotates downward as a result of the resilient force of the compressive coil spring 340, whereby the engaging edge 332b engages the engaging face 216b of the engaging protrusion 216 (see FIG. 12). This results in a locking operation that keeps the drawer section 300 completely housed in the outside housing 200.

A short time before the tray 310 reaches the housed position of FIG. 1, the back end of the ejector 317 shown in FIG. 9 is in contact with a rear face 217 of the bottom chassis 210 of the outside housing 200. Pushing the drawer section 300 further rearward from the position in FIG. 1 causes the ejector 317 to oppose the tensile force of the extension coil spring 317a and to move forwardly relative to the drawer section 300. This further stretches the extension coil spring 317a, so that force accumulates in the extension coil spring 317a.

Pressing the eject button 322 on the front panel 320 causes an unlocking mechanism described later to operate. When the unlocking mechanism operates, the back end of the lock arm 331 rotates upward, whereby the engaging pawl 332 and the engaging protrusion 216 of the outside housing 200 disengage from each other. The force, accumulated in the extension coil spring 317a, causes the ejector 317 to protrude from the back edge of the drawer section 300, as a result of which the front edge of the drawer section 300 protrudes from the outside housing 200. Here, when the front end of the drawer section 300, which protrudes from the outside housing 200, is pulled towards the front, the drawer section 300 as well as the rail members 250L and 250R slide forwardly with respect to the guide members 240L and 240R, respectively, until the stoppers 252 of the rail members 250L and 250R engage the stoppers 242 of the guide members 240L and 240R. When the stoppers 252 engage the stoppers 242, the drawer section 300 slides forwardly with respect to the rail members 250L and 250R, until the stopper protrusions 315b come into contact with the back ends of the dislodging preventing edges 253 of the rail members 250L and 250R, and then move to the drawn-out position of FIG. 2.

When an emergency, caused, for example, by the running down of a power supply, occurs, so that an eject operation is not performed even when the eject button 322 is pressed, a thin rod-like object may be inserted into the tray 310 through the receiving hole 323 in the front panel 320 and the emergency receiving hole 318 in the tray 310. This causes an end of the rod-like object to push the emergency pushing portion 335 of the lock arm 331, causing the back end of the lock arm 331 to rotate upward, whereby the engaging pawl 332 and the engaging protrusion 216 of the outside housing 200 disengage from each other. The force, accumulated in the extension coil spring 317a, causes the front end of the drawer section 300 to protrude from the outside housing 200.

Figure 16:
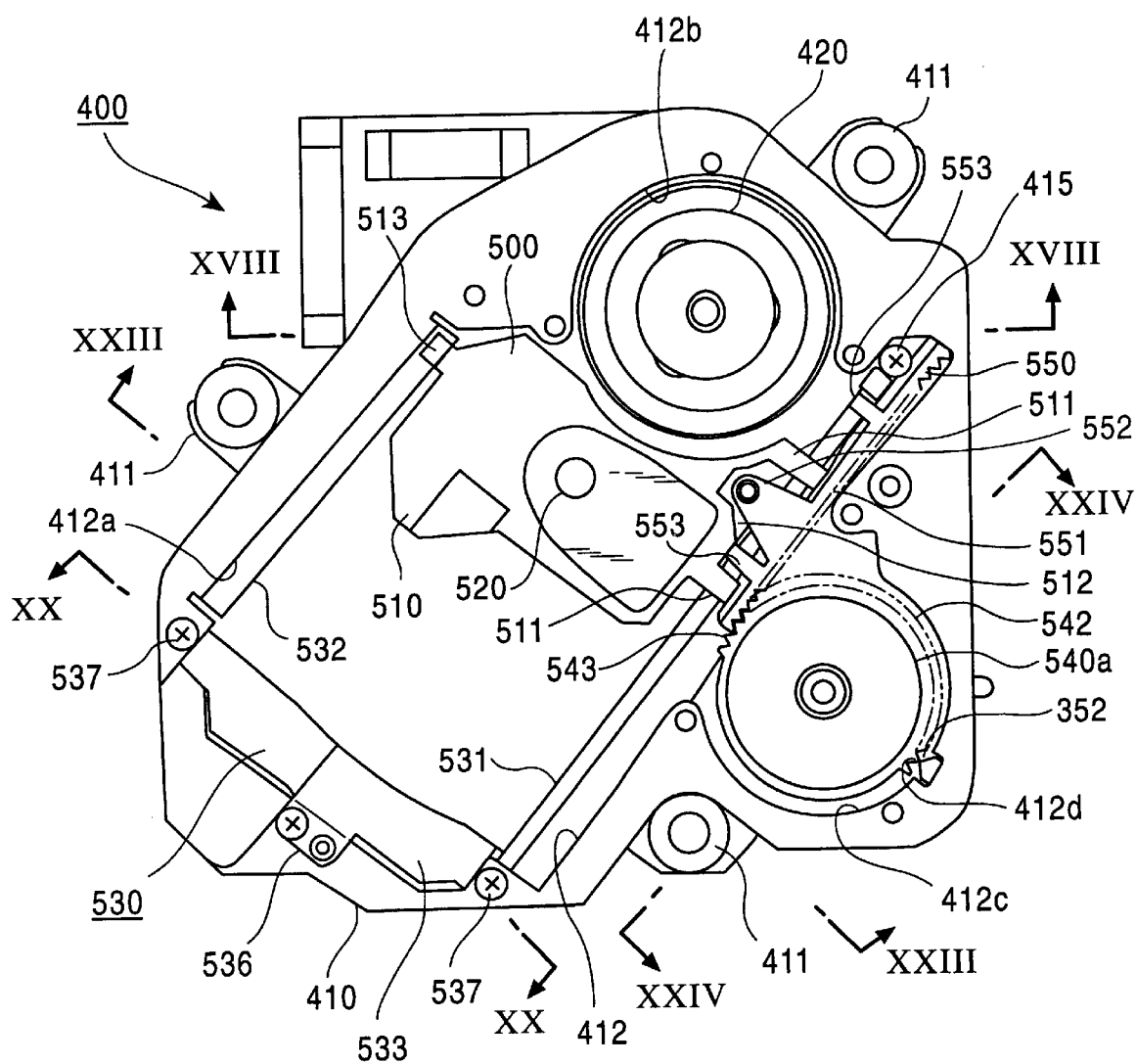
FIG. 16 is a plan view of a base unit.
Figure 17:
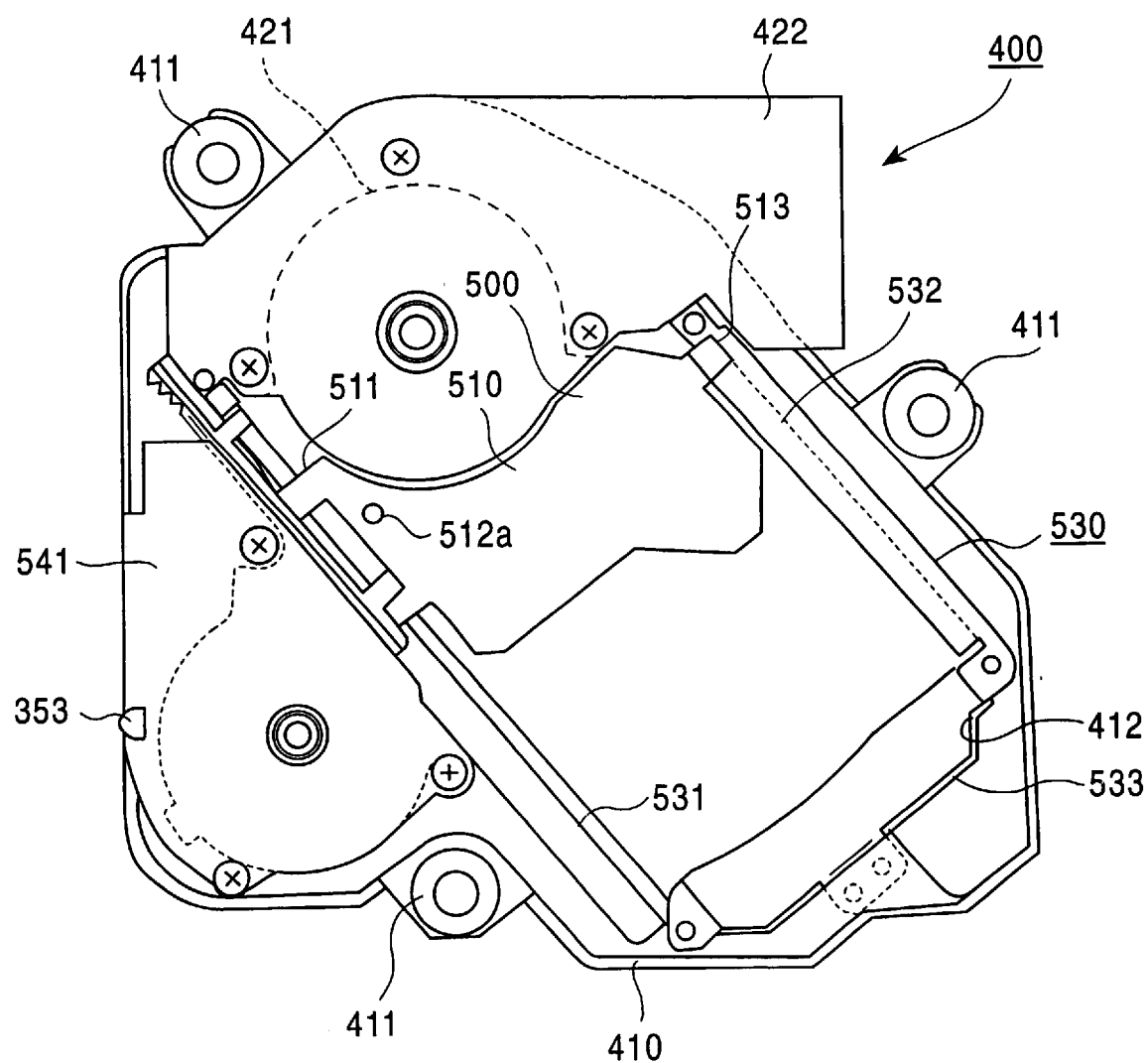
FIG. 17 is a bottom view of the base unit.

FIGS. 16 and 17 show the base unit 40 being supported at the bottom surface of the main face 311 of the tray 310 of the drawer section 300.

A sub-chassis 410, made of a sheet metal, is supported at the bottom surface of the tray 310 through rubber dampers 411.

The sub-chassis 410 has a large opening 412 that extends over almost the entire sub-chassis 410. The opening 412 has a substantially rectangular shape which extends from the left front side to the right back side. The opening 412 includes continuously formed openings, that is, a pickup opening 412a that is inclined with respect to other portions such that its back edge extends substantially horizontally, a substantially semi-circular turntable opening 412b that is formed continuously with the rear edge of the pickup opening 412a, and a sled motor opening 412c whose shape is more than a semicircle and is formed continuously with the rear end portion of the side edge of the pickup opening 412a facing towards the right and forward direction.

Figure 18:
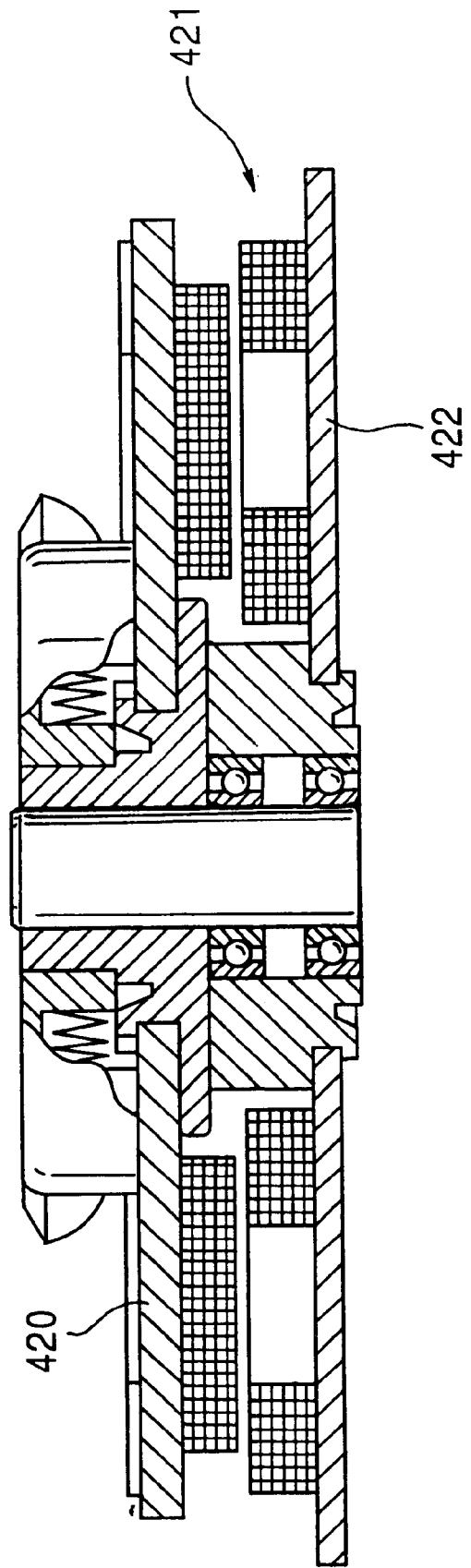
FIG. 18 is a sectional view taken along line XVIII—XVIII of FIG. 16.

The turntable 420 is placed such that its top end protrudes upwardly of the sub-chassis 410 from the turntable opening 412b. In other words, as shown in FIG. 18, a stator base 422, which supports a spindle motor 421, is affixed to the bottom surface of the sub-chassis 410, and the turntable 420 is integrally formed with the rotor of the spindle motor 421, whereby the turntable 420 is disposed at the aforementioned position.

An optical pickup 500 is disposed so as to be movable in a direction which allows it to separate from and come into contact with the turntable 420, in the aforementioned pickup opening 412a.

The optical pickup 500 is formed by mounting on a movable base 510 an optical block (not shown) which includes, for example, a semiconductor laser; an objective lens 520 which gathers and concentrates laser beams on a CD-ROM on the turntable; and a biaxial actuator, or the like, which moves the objective lens 520 in a focusing direction and a tracking direction.

The movable base 510 moves by being guided by a guide shaft 531 and a sub-guide shaft 532. The guide shaft 531 is shaped like a round bar, and the sub-guide shaft 532 is formed by bending a sheet metal.

Figure 19:
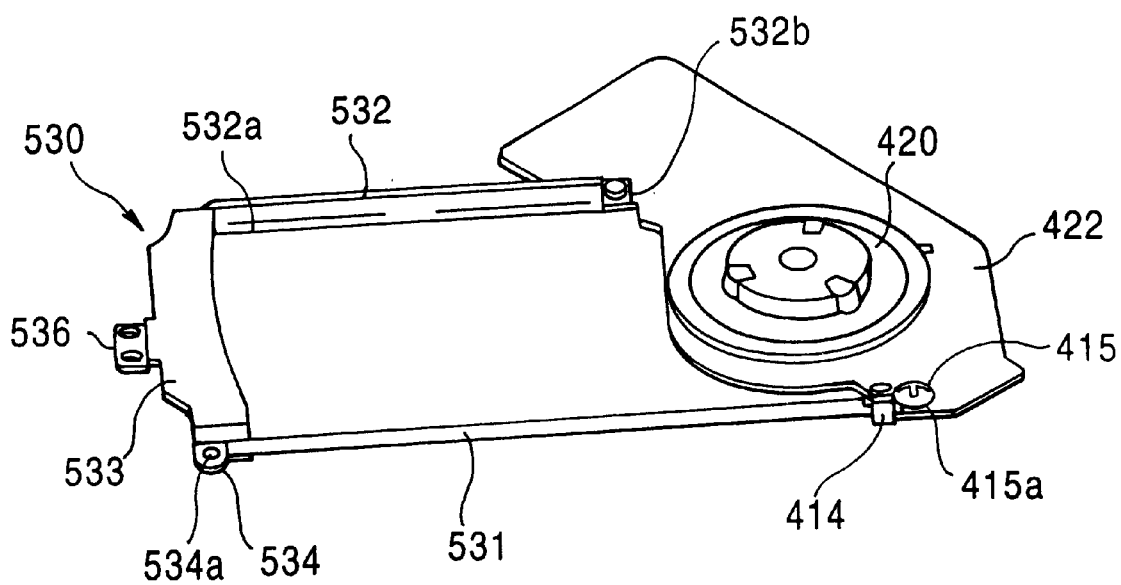
FIG. 19 is a perspective view of a guide shaft assembly.

As shown in FIG. 19, the sub-guide shaft 532 is integrally formed with a guide shaft supporting plate 533 which integrally supports the aforementioned two guide shafts 531 and 532, with the guide shaft support plate 533 and the integrally supported guide shafts 531 and 532 together forming a guide shaft assembly 530. The guide shaft supporting plate 533, which is made of a springy metal sheet, is formed into the shape of a plate which is slightly longer than the width of an edge of the pickup opening 412a, with a guide shaft supporting section 534 formed at the right end thereof, a sub-guide shaft connecting section 535 formed at the left end thereof, and a mounting portion 536 formed at the center thereof in the horizontal direction of the front edge. Threaded holes 534a and 535a are formed in the guide shaft supporting section 534 and the sub-guide shaft connecting section 535, respectively. The sub-guide shaft 532 has a guide section 532a formed by bending a side edge of a long plate-like sheet metal into a U shape, and a protruding mounting portion 532b formed continuously with the back end of the guide section 532a. The front end of the guide section 532a is integrally and continuously formed with the sub-guide shaft connecting section 535 of the guide shaft supporting plate 533.

The front end of the guide shaft 531 is affixed to the guide shaft supporting section 534 of the guide shaft supporting plate 533. The guide shaft 531 is affixed to the guide shaft supporting section 534 by any suitable means, such as by bonding or screwing. In this way, the guide shaft 531 and the sub-guide shaft 532 are formed integrally with the guide shaft supporting plate 533, whereby the guide shaft assembly 530 is formed.

Figure 20:
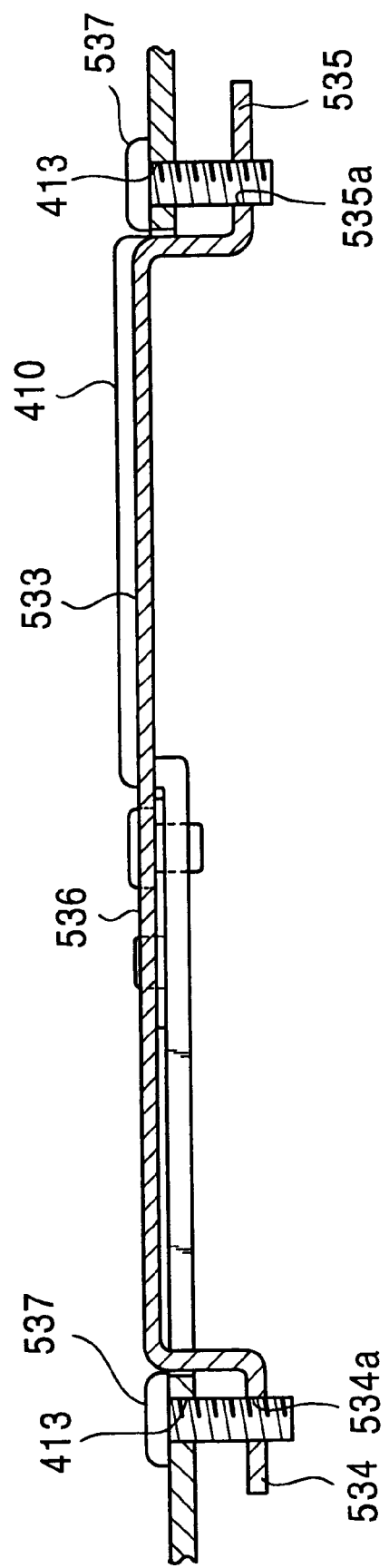
FIG. 20 is a sectional view taken along line XX—XX of FIG. 16.

The mounting portion of the guide shaft supporting plate 533 is affixed, by any suitable means such as by screwing, to the bottom surface of an edge of the sub-chassis 410 in correspondence with the center of the front edge of the pickup opening 412a. Adjuster screws 537 and 537, formed at locations corresponding to the locations of the threaded holes 534a and 535a in the sub-chassis, are inserted into the screw receiving holes 413 from above the screw receiving holes 413, and are separately screwed into the threaded holes 534a and 535a. (Refer to FIG. 20.) Since the guide shaft supporting plate 533 is made of a springy sheet metal, when the adjuster screws 537 are screwed into the threaded holes 534a and 535a, the guide shaft supporting section 534 and the sub-guide shaft connecting section 535 move closer to the sub-chassis 410, whereas when the adjuster screws 537 are screwed outward in the threaded holes 534a and 535a,
the guide shaft supporting section 534 and the sub-guide shaft connecting section 535 move away from the sub-chassis 410.

The back ends of the guide shaft 531 and the sub-guide shaft 532 are affixed to the stator base 422. More specifically, the back end of the guide shaft 531 is received by a receiver section 414, formed into a U shape facing upward and formed on the top surface of the stator base 422, from above the receiver section 414, and a head 415a of a screw 415, which has been screwed into a location adjacent to and behind the receiver section 414, holds down the back end of the guide shaft 531 from above it, whereby the back end of the guide shaft 531 is affixed to the stator base 422 (see FIG. 19). The sub-guide shaft 532 is affixed by screwing the mounting portion 532b at the back end of the sub-guide shaft 532 into the stator base 422 (see FIG. 19).

Figure 21:
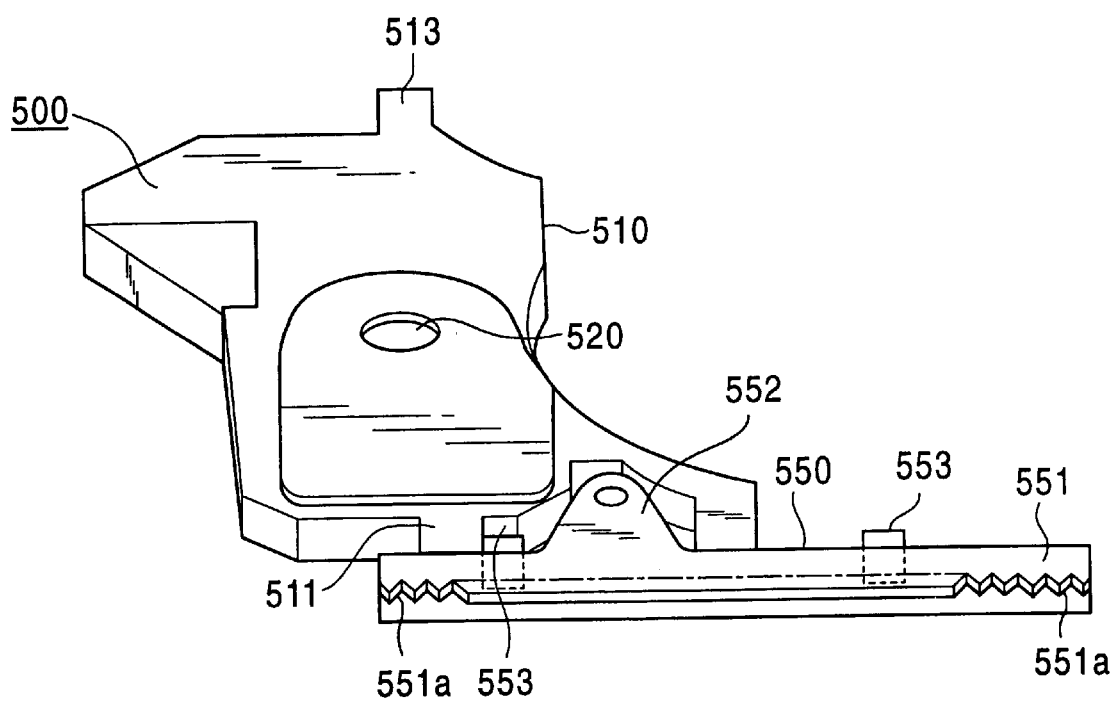
FIG. 21 is a perspective view of a movable base and a rack member.
Figure 22:
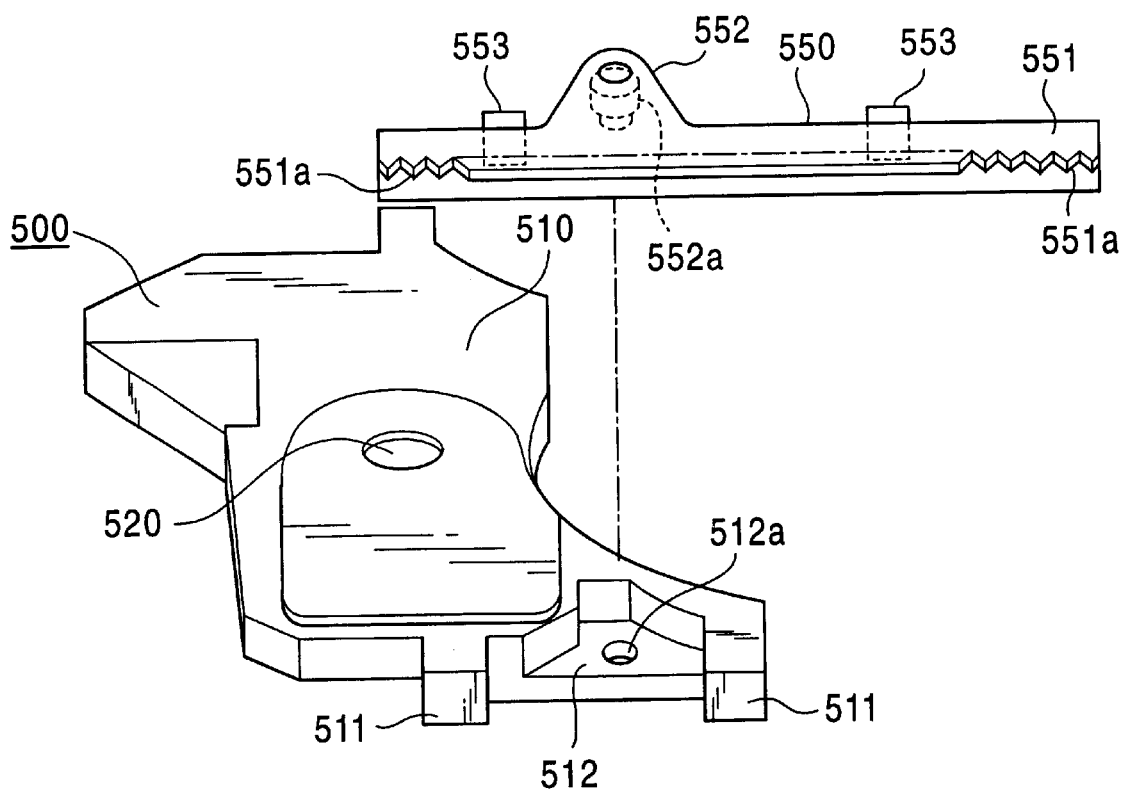
FIG. 22 is an exploded perspective view of the movable base and the rack member.
Figure 23:
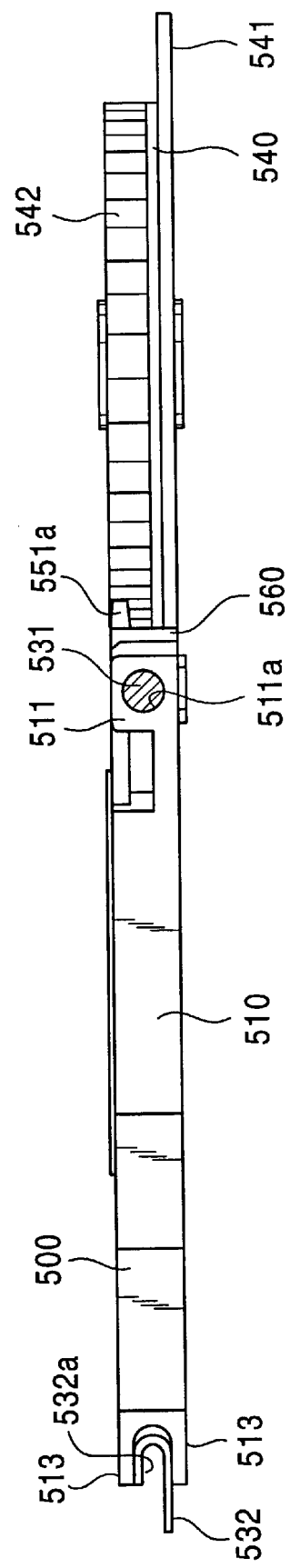
FIG. 23 is a sectional view taken along line XXIII—XXIII of FIG. 16.
Figure 24:
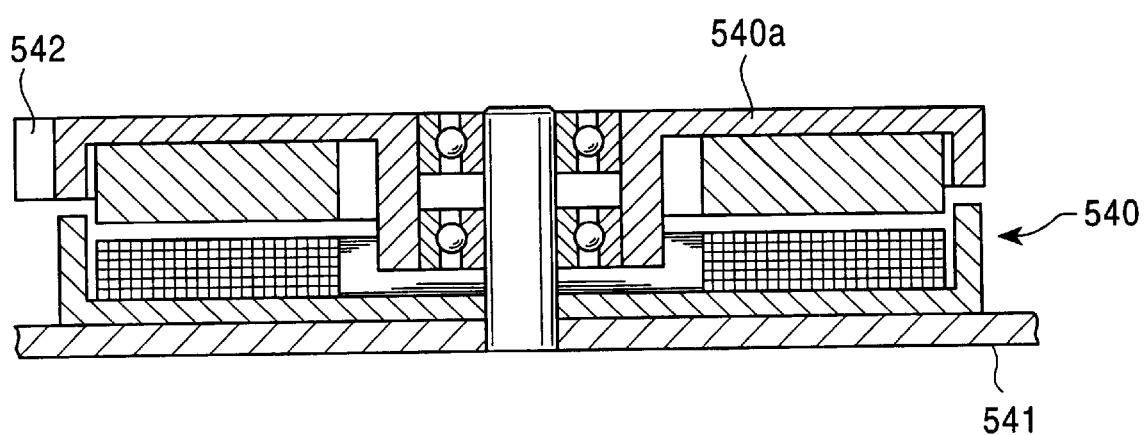
FIG. 24 is a sectional view taken along line XXIV—XXIV of FIG. 16.

FIGS. 21 to 23 are views showing the assembled structure of the movable base 510 and a rack member 550 described later. Protruding guide sections 511 are formed at the right end of the movable base 510, with a connecting section 512, having a connecting hole 512a formed therein, being formed between these guide sections 511. Guide holes 511a are formed coaxially in the guide sections 511, respectively. (Refer to FIG. 23.) Guide portions 513, which are spaced in the vertical direction and protrude parallel to each other, are formed at the left end of the movable base 510.

The guide shaft 531 is slidably inserted into the guide holes 511a in the movable base 510, and the guide portions 513 of the movable base 510 are in slidably contact with the top and bottom faces of the aforementioned sub-guide shaft 532, respectively, whereby the optical pickup 500 is supported by the sub-chassis 410 so as to be guidable and movable along the guide shaft 531 and the sub-guide shaft 532.

The degree of precision of signal reading by the optical pickup 500 with respect to a CD-ROM depends on the degree of verticalness of the laser beam, gathered and concentrated on the CD-ROM on the turntable 420, with respect to the CD-ROM, that is on the degree of verticalness of the optical axis of the objective lens 520 with respect to the CD-ROM on the turntable 420.

Therefore, it is necessary to make adjustments or perform the so-called skew adjustment in order to make the optical axis of the objective lens 520 perpendicular to the CD-ROM on the turntable 420.

The aforementioned skew adjustment is performed with adjuster screws 537 in order to adjust the distance between the guide shaft supporting section 534 and/or the sub-guide shaft connecting section 535 and the sub-chassis 410, that is the distance between the guide shaft 531 and/or the sub-guide shaft 532 and the sub-chassis 410.

As mentioned above, since the turntable 420 is integrally formed with the spindle motor 421 that is affixed to the stator base 422, the disk-placing plane of the turntable 420 and the spindle motor 421 placing plane of the stator base 422 can be considered as being parallel to each other, so that a line connecting the back end of the guide shaft 531, affixed to the stator base 422, and the back end of the sub-guide shaft 532 can be considered as being parallel to the disk-placing plane of the turntable 420.

Adjusting the height of the front end of the guide shaft 531 and/or the sub-guide shaft 532 enables skew adjustment of the optical pickup 500 that is supported by the guide shaft 531 and the sub-guide shaft 532. In other words, separately adjusting the height of the front end of the guide shaft 531 and the sub-guide shaft 532 enables skew adjustment in a tangential direction, and adjusting the height of the guide shaft 531 and the sub-guide shaft 532 at the same time by the same amount enables skew adjustment in a radial direction.

A description will now be given of the mechanism for moving the optical pickup 500 in a radial direction of a CD-ROM on the turntable 420.

A motor-supporting plate 541, which supports a sled motor 540, is affixed to the bottom surface of the sub-chassis 410, and the sled motor 540 is positioned at the sled motor opening 412*c*. A drive gear section 542 is formed at an outer periphery of a rotor 540*a* of the sled motor 540 so as to extend along substantially half the circumference of the sled motor 540. A release cam section 543 is formed in contact with a side edge of the drive gear section 542 at a counterclockwise direction side, as seen from above the drive gear section 542, and is substantially trapezoidal, as seen from thereabove. An outer end face 543*a* thereof is located on the same circumference as that of the addendum circle of the drive gear 542, and the stem of the release cam section 543 is located on the same circumference as that of the deddendum circle of the drive gear section 542 (see FIGS. 10 and 11).

As shown in FIGS. 21 to 23, a rack member 550 is connected to the optical pickup 500.

The rack member 550 is made of synthetic resin, with rack teeth 551*a* formed, in a longitudinal direction, at one face of a rack section 551 having an elongated plate-like shape. A connecting portion 552 protrudes from a face of the rack section 551 which is opposite to the face of the rack section 551 where the rack teeth 551*a* are formed, with a connecting pin 552*a* being vertically provided at one end of the connecting portion 552. Inverted L-shaped engaging portions 553 are formed on both sides of the connecting portion 552, in a plane in which the connecting portion 552 is formed.

The engaging portions 553, formed on the rack member 550, slidably engage the guide shaft 531, and the connecting pin 552*a*, provided at the connecting portion 552, engages a connecting hole 512*a* in the movable base 510 of the optical pickup 500, whereby the movable base 510 and the rack member 550 are integrally moved so as to be guided by the guide shaft 531 and the sub-guide shaft 532. The rack teeth 551*a* of the rack member 550 engage the drive gear section 542. Accordingly, driving the sled motor 540 rotates the drive gear section 542, causing the rack member 550 to move forward. Integrally therewith, the optical pickup 500 is guided by the guide shaft 531 and the sub-guide shaft 532 and moves in a radial direction of a CD-ROM on the turntable 420.

A description will now be given of the mechanism for unlocking the drawer section 300 that has been completely housed in the outside housing 200.

Figure 11:
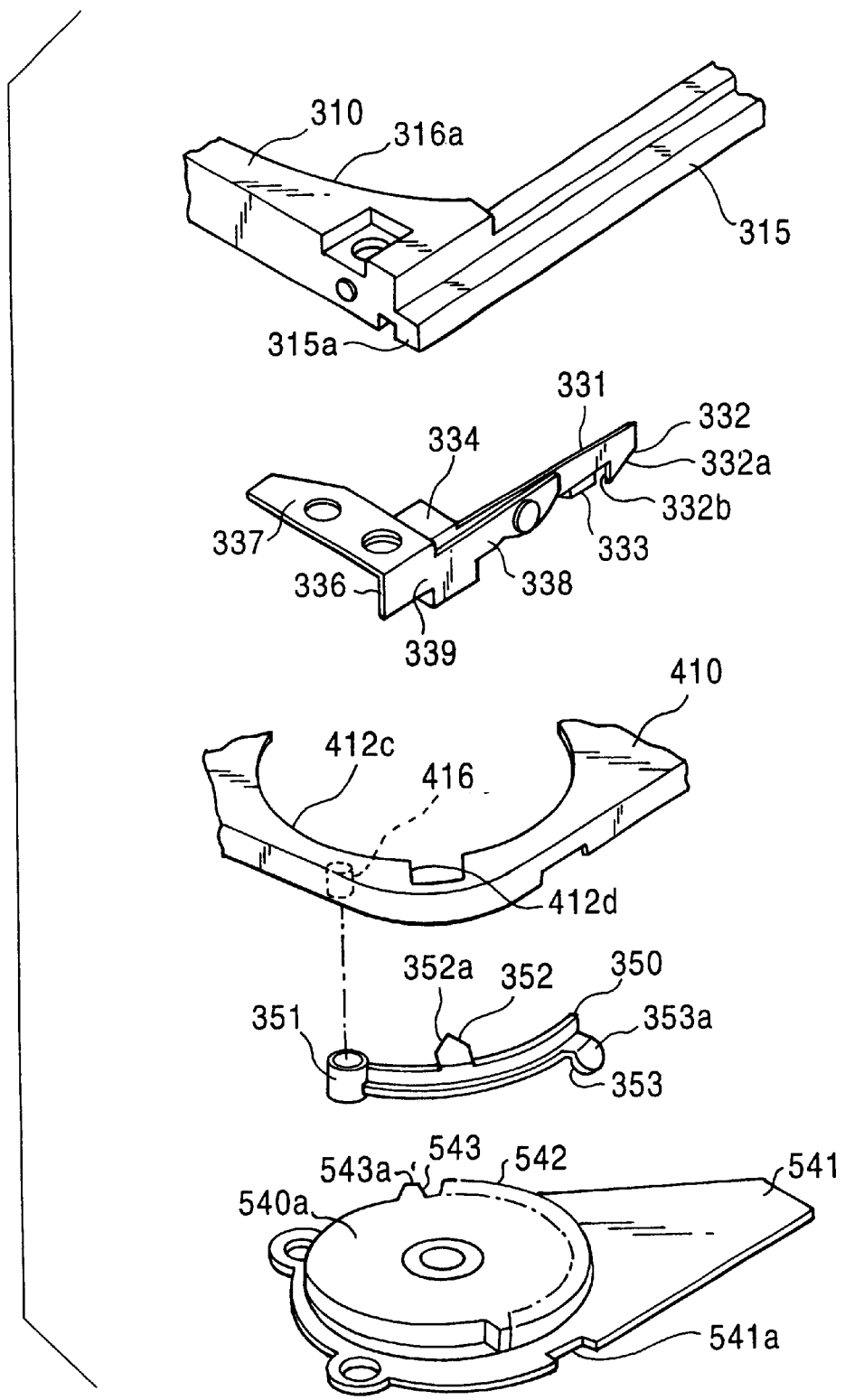
FIG. 11 is an exploded perspective view of the lock mechanism and the members related thereto.

As shown in FIGS. 11 and 12, an unlocking arm 350, formed into a substantially arcuate shape using synthetic resin, is provided at the sub-chassis 410. As seen from above, the unlocking arm 350 has a substantially arcuate shape, with a support section 351 formed at the front end thereof. The support section 351 has a cylindrical shape that extends vertically.

A push section 352 is formed so as to protrude inwardly from a portion, located slightly towards the support section 351 from the center of the unlocking arm 350, of the top edge of the unlocking arm 350. An inclined face 352*a*, which extends towards the back as it protrudes, is formed at the front face of the push section 352.

A pushing section 353 is formed at the outer side of the rear end of the unlocking arm 350, that is, it formed in such a manner as to protrude downwardly from and outwardly of the lower edge, in an opposite direction from the center of the arcuate shape. A pushing face 353*a*, which is displaced downwards as it extends outwards, is formed at the upper face of the pushing section 353.

A support shaft 416, which is vertically formed along an edge of a sled motor opening 412*c* in the sub-chassis 410, is rotatably fitted into the support section 351 of the unlocking arm 350, whereby the unlocking arm 350 is rotatably supported by the sub-chassis 410 and the motor supporting plate 541. It is to be noted that the top edge of the unlocking arm 350 is located in the gap between an edge of the sled motor opening 412*c* of the sub-chassis 410 and the rotor 540*a* in the sled motor; that the push section 352 is located in a cutout 412*d* in the edge of the sled motor opening 412*c*; and that the pushing section 353 is located in a cutout 541*a* in the motor supporting plate 541. When an end of the unlocking arm 350 is rotated towards the sled motor, the pushing section 353 comes into contact with the back edge of the cutout 541*b*, thereby limiting rotation in that direction, so that the unlocking arm 350 will not come into contact with the rotor 540*a* of the sled motor 540. The pushing face 353*a* of the unlocking arm 350, positioned in this manner, has one end disposed so as to come into contact with the push portion 333 of the lock arm 331 from therebelow or to be located in the vicinity of the push portion 333 of the lock arm 331.

A description will now be given of an unlocking operation by the above-described unlocking mechanism, with reference to FIGS. 25 to 27.

Figure 25:
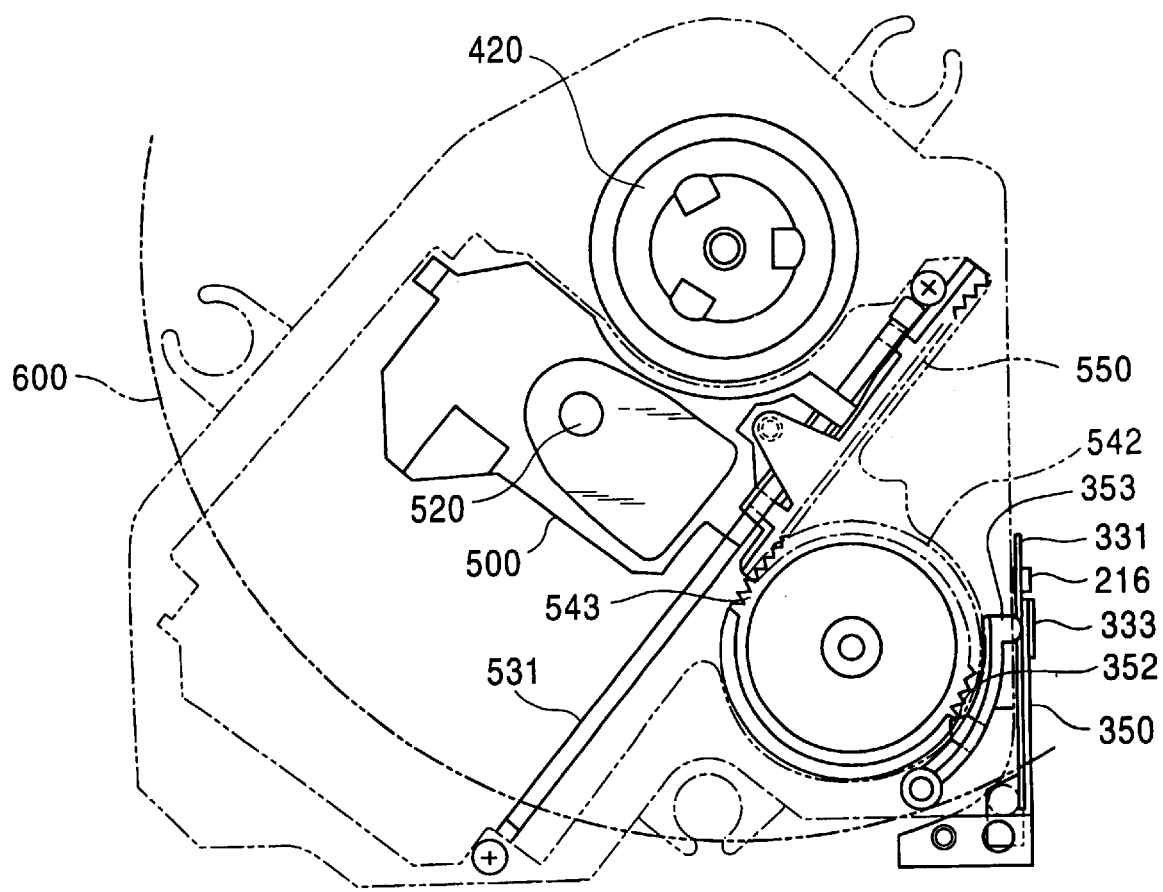
FIG. 25, which along with FIGS. 26 and 27 is a plan view of the main portion of an optical pickup and a sled motor for illustrating the operations thereof, shows the optical pickup being positioned at the innermost periphery of an information recording area of a CD-ROM.
Figure 26:
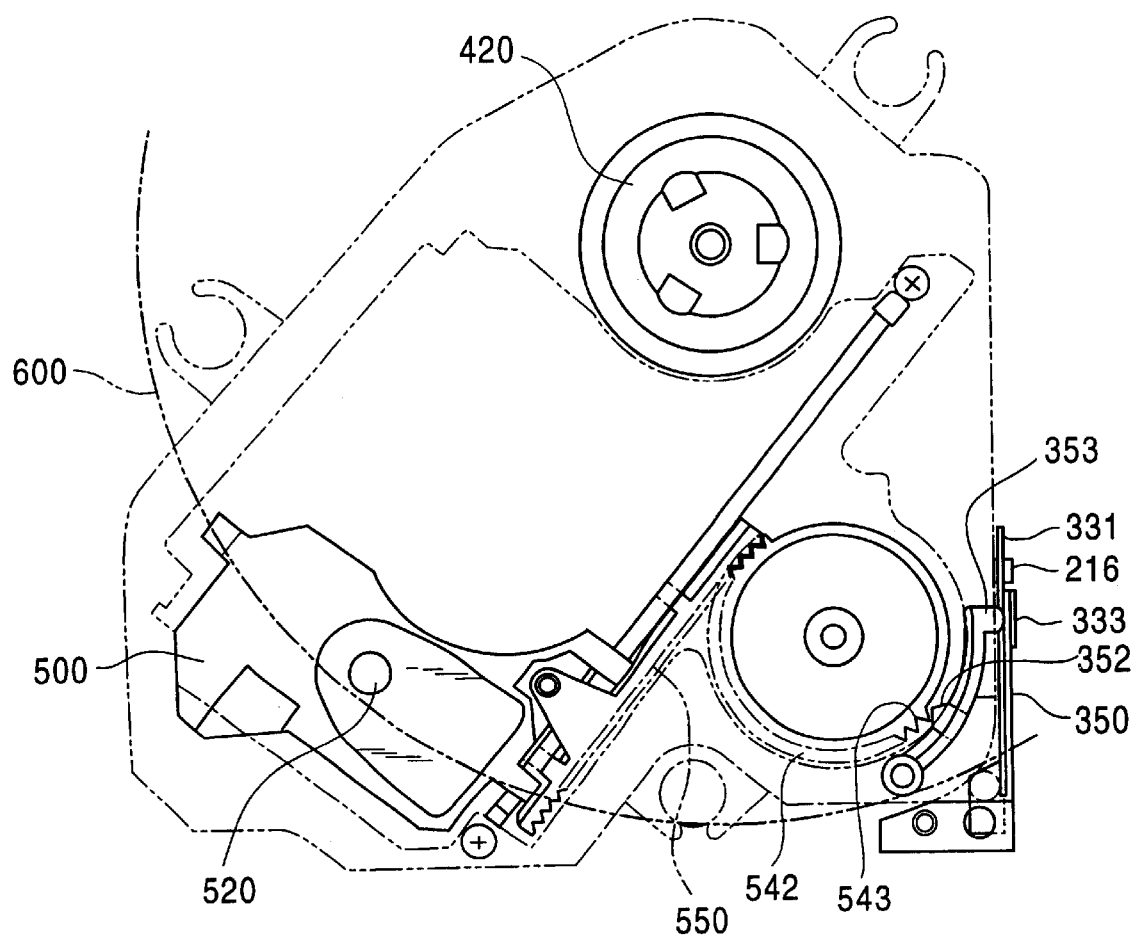
FIG. 26 is a plan view showing the optical pickup being positioned at the outermost periphery of the information recording area of the CD-ROM.
Figure 27:
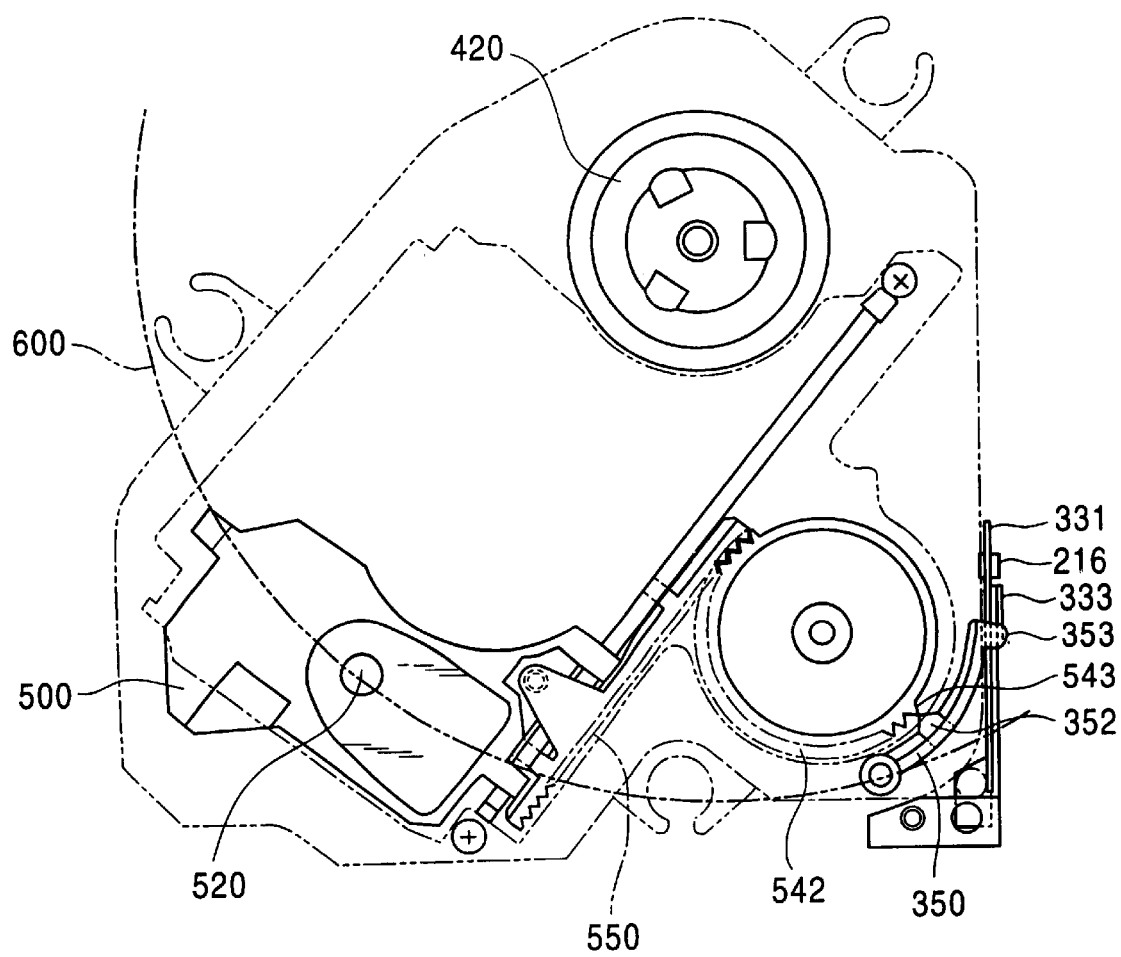
FIG. 27 is a plan view showing the optical pickup being positioned outside the outermost periphery of the information recording area of the CD-ROM.

As shown in FIG. 25, when the optical pickup 500 is positioned at the innermost periphery of an information recording area of a CD-ROM 600 on the turntable 420, the edge of the drive gear section 542 at the clockwise direction side is located near the push section 352 of the unlocking arm 350 at the counterclockwise direction side, whereas, as shown in FIG. 26, when the optical pickup 500 is at the outermost periphery of an information recording area of the CD-ROM 600, the release cam section 543, provided at the rotor 540*a* of the sled motor 540, is located near the push section 352 of the unlocking arm 350, as viewed from the clockwise direction side. Accordingly, during the time in which the optical pickup 500 is reading a signal from the CD-ROM 600, movement of the rotor 540*a* of the sled motor 540 in no way affects the unlocking arm 350.

Pressing the elect button 322 on the front panel 320 causes the sled motor 540 to further rotate counterclockwise from its position shown in FIG. 26, so that the optical pickup 500 moves outward from the outermost periphery of an information recording area of the CD-ROM 600. Meanwhile, as shown in FIG. 27, the release cam section 543 pushes the inclined face 352*a* of the push section 352 of the unlocking arm 350, causing the unlocking arm 350 to be rotated slightly clockwise, as viewed from the top thereof.

Rotating the unlocking arm 350 clockwise causes the portions that are higher than the pushing face 353*a* to oppose the push portion 333 of the lock arm 331 in order to cause the pushing face 353*a* to push the push portion 333 upward, whereby the back end of the lock arm 331 rotates upward (as indicated by the alternate long and two short dash lines in FIG. 12), as a result of which the engaging pawl 332 and the engaging protrusion 216 of the outside housing 200 disengage from each other. The action of the injector 317 and the extension coil spring 317*a* causes the front end of the drawer section 300 to protrude from the outside housing 200.

Immediately after the drawer section 300 protrudes from the outside housing 200 the sled motor 540 rotates clockwise, which causes the optical pickup 500 to move, for example, to a location in correspondence with the innermost periphery of an information recording area of the CD-ROM 600, that is to a location where TOC of the CD-ROM can be read. This causes the release cam section 543 to move away from the push section 352 of the unlocking arm 350, so that the resilient force of the compressive coil spring 340 causes the lock arm 331 to move back to its original position, that is the engaging pawl 332 to return back to the position where it can engage the engaging protrusion 216 of the outside housing 200. The force of movement thereof acts on the pushing face 353a of the pushing section 353 through the push portion 333 of the lock arm 331, causing the unlocking arm 350 to rotate to a location where it can contact the back edge of the cutout 541b in the motor supporting plate 541. When this causes the drawer section 300 to be pushed again into the outside housing 200, a locking operation is performed to keep the tray 310 completely housed in the main space 230 in the outside housing 200, that is to lock it in the housed position. Since the horizontal width of the tray 310 is smaller than the diameter of the CD-ROM 600, the right side of the CD-ROM 600, placed on the turntable 420, extends beyond the right side of the tray 310. Therefore, when the tray 310 is housed in the outside housing 200, the portion of the CD-ROM 600 extending beyond the right side of the tray 310 is placed within a disk auxiliary space 231 in the outside housing 200.

In the above-described CD-ROM drive 100, the drive gear section 542, which engages the rack section 551 of the optical pickup 500, is provided integrally with the rotor 540a of the sled motor 540, so that the rotation of the sled motor 540 is directly transmitted to the drive gear section 542. The rack section 551 of the optical pickup 500 is moved forward by means of the drive gear section 542, thereby shortening the seek time of the optical pickup 500 and allowing rapid seek operations.

In addition, since nothing which causes backlash is provided in the area extending from the sled motor 540 to the drive gear section 542, error in movement of the optical pickup 500 with respect to the amount of rotation of the sled motor 540 becomes very small, thereby allowing accurate seek operations. Further, a mechanism for eliminating backlash, required in conventional disk drives, does not have to be provided, thereby reducing the number of parts, costs, and disk drive size.

Still further, according to the foregoing embodiments, when the drive gear section 542 is disposed in correspondence with about the center of the range of movement of the rack section 551 while the optical pickup 500 moves from the inner periphery to the outer periphery of an information recording area of the recording medium disk 600, it is possible to reduce the length of the rack section 551 to the minimum required.

Still further, when the direction of movement of the optical pickup 500 is set obliquely to the direction of movement of the drawer section 300, that is, when the direction of extension of the guide shaft 531 and the sub-guide shaft 532 is set obliquely to the direction of movement of the drawer section 300, so that the sled motor 540 is disposed in a triangular dead space produced at the sub-chassis 410, it is possible to reduce the horizontal width of the tray 310, that is the size of the drawer section 300 in a direction perpendicular to the direction of movement thereof.

In the foregoing embodiments the drive gear section 542 was formed integrally with the rotor 540a of the sled motor 540. All that is required is that the drive gear section be integrally formed with the rotor, so that, for example, with the rotary shaft of the rotor being formed so as to protrude towards or away from the rotor side, the drive gear section may be press-fitted and affixed to the rotary shaft.

In the above-described disk drive 100, skew adjustment of the optical pickup 500 can be performed by adjusting the space between the sub-chassis 410 and the adjustment end of the guide shaft 531 and/or the adjustment end of the sub-guide shaft 532 as a result of rotating the adjuster screw 537 and/or the adjuster screw 537. Therefore, even if the sub-chassis 410 is not that flat or that precise as to dimension, the laser beams from the optical pickup 500 can be kept vertical with respect to the information recording surface of the CD-ROM 600 that it is irradiating. This results in increased yield of the sub-chassis 410, making it possible to reduce costs and produce a greater number of disk drives.

In the above-described embodiment, although the adjustment ends of the guide shaft 531 and the sub-guide shaft 532 were supported at the sub-chassis 410 through the guide shaft supporting plate 533, they may be supported directly by the sub-chassis 410 in such a manner that the space therebetween is adjustable, without the use of guide shaft supporting plate 533.

In addition, in the above-described embodiment, although the locations of the adjustment ends of both the guide shaft 531 and the sub-guide shaft 532 were adjustable, in other embodiments either one of them may be made adjustable.

Figure 28:
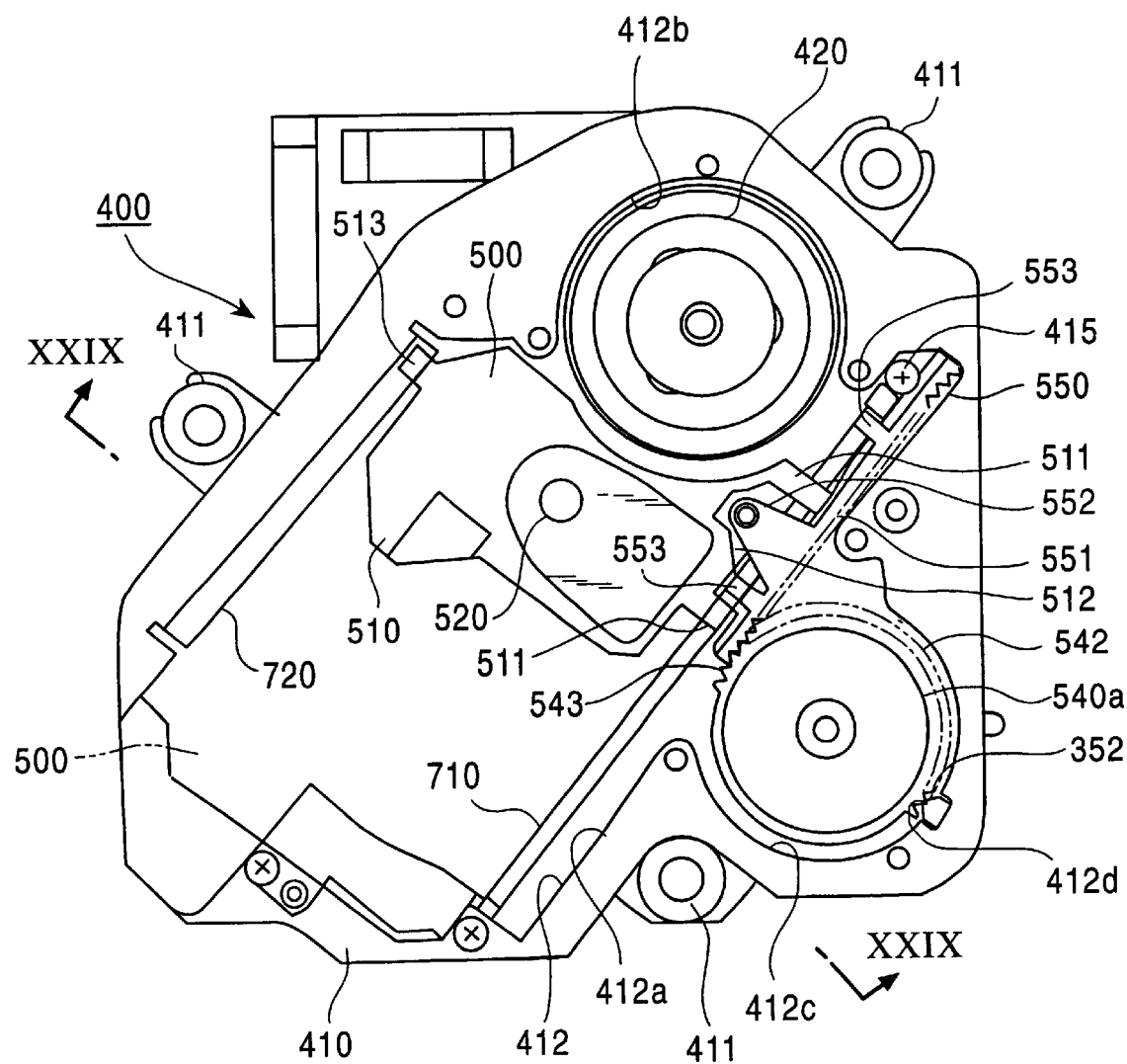
FIG. 28, which shows a second embodiment of a pickup guiding mechanism in a disk drive, is a plan view of a base unit.
Figure 29:
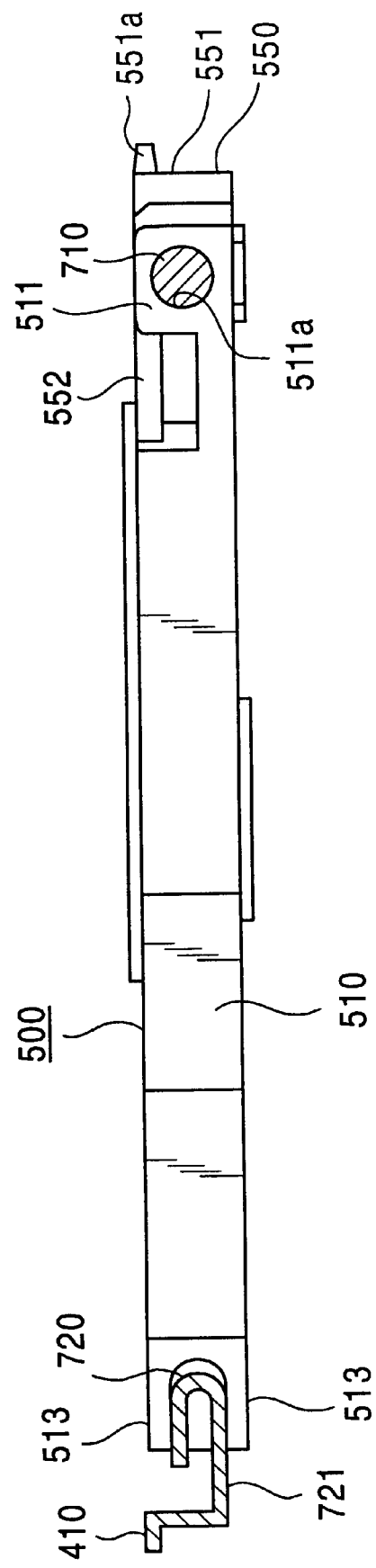
FIG. 29 is a sectional view taken along line XXIX—XXIX of FIG. 28.

FIGS. 28 and 29 are views showing a second embodiment of the present invention. The second embodiment primarily differs from the first embodiment in the form of the sub-guide shaft. The other parts are almost the same as those of the first embodiment. Therefore, only the aforementioned dissimilar part will be described in detail. Other parts corresponding to those of FIG. 1 are given the same reference numerals, and will not be described below.

A guide shaft 710, which is made of a metal and is cylindrical in shape, is disposed along one of the side edges of an opening 412 of the sub-chassis 410, with both ends of the guide shaft 710 being affixed to the bottom surface of the sub-chassis 410.

A sub-guide shaft 720 is integrally formed with the other side edge of the opening 412 of the sub-chassis 410. More specifically, an edge of the opening in the sub-chassis 410 is bent into an L shape in transverse cross section, and the outer edge of part 721 which extends horizontally from the bent edge is bent upward into the shape of an inverted U in transverse cross section from below, whereby the sub-guide shaft 720 is formed.

The guide shaft 710 is slidably inserted into guide holes 511a and 511a of the optical pickup 500, and guide portions 513 and 513 are in slidable contact with the upper and lower faces of the sub-guide shaft 720, whereby the optical pickup 500 is movable in directions in which it comes into contact with and separates from the turntable 420.

Figure 30:
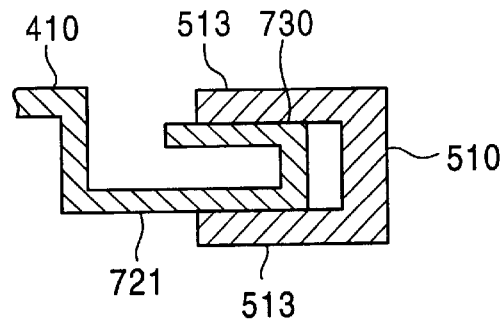
FIG. 30 is an enlarged sectional view of the main portion of a modification of the sub-guide shaft.
Figure 31:
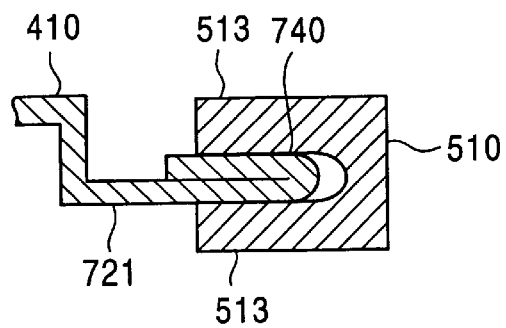
FIG. 31 is an enlarged sectional view of the main portion of another modification of the sub-guide shaft.
Figure 32:
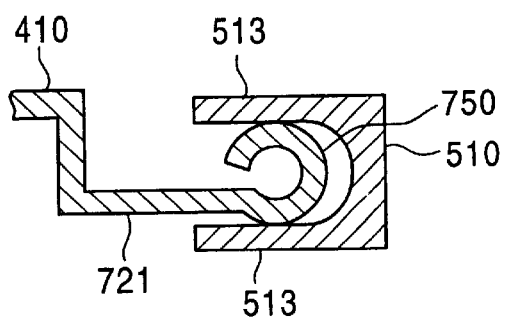
FIG. 32 is an enlarged sectional view of the main portion of still another modification of the sub-guide shaft.

FIGS. 30 to 32 are views showing different modifications of the sub-guide shaft.

FIG. 30 is a view showing a sub-guide shaft 730 that is formed by bending a sheet metal into a U shape in transverse cross section.

FIG. 31 is a view showing a sub-guide shaft 740 that is formed by folding a sheet metal upon itself.

FIG. 32 is a view showing a sub-guide shaft 750 formed by bending a sheet metal into a substantially cylindrical shape.

Obviously, the modified sub-guide shafts 730, 740, and 750, shown in FIGS. 30 to 32, respectively, are applicable, not only to the second embodiment, but also to the first embodiment.

As can be understood from the foregoing description, in the above-described optical pickup 500 guiding mechanism, the sub-guide shaft is formed by bending a sheet metal, so that when it is formed into a cylindrical shape it can be produced at a relatively low cost. In addition, since metal sheet is used as material, the sub-guide shaft has sufficient strength and has good temperature characteristics. As regards the way in which the optical pickup 500 can be made to occupy only a limited location, either the guide shaft 531 or the guide shaft 710 is formed into a cylindrical shape in order to limit the location occupiable by the optical pickup 500 in all directions perpendicular to a direction of movement thereof, so that no problems arise when the sub-guide shaft 532, 720, 730, 740, or 750 is used to limit the location occupiable by the optical pickup 500 in all directions perpendicular to the direction in which the guide shaft 531 or the guide shaft 710 is disposed.

A description will now be given of a third embodiment of the present invention with reference to FIGS. 33 and 34.

The disk drive of the third embodiment differs from that of the first embodiment in the lock mechanism and the unlocking mechanism used for unlocking the lock mechanism which locks the tray at the housed position. The parts other than the lock mechanism and the unlocking mechanism are essentially the same. Therefore, only the lock and the unlocking mechanisms will be described in detail below. The parts corresponding to those of the first embodiment are given the same reference numerals as those given to the corresponding parts of the first embodiment, and will not be described below.

The lock mechanism 800 of a CD-ROM drive 100A comprises a lock arm 810 provided at a tray 300, and an engaging section 820 provided at a bottom chassis 210.

The engaging section 820 is a plate-like section formed vertically from a location near the left side face 214 of a main section 211 of the bottom chassis 210. It has a main section 821 and an inclined section 822 that is integrally formed with the main section 821. The main section 821 extends in the forward-and-backward direction, and the inclined section 822 extends from a front edge of the main section 821 forwardly and slightly leftwards. The back edge 821a of the main section 821 serves as an engaging edge.

The lock arm 810 is long and extends substantially in the forward-and-backward direction, and is rotatably supported at a portion near the left edge of the lower surface of the tray 310. A tension coil spring (not shown) is associated with the lock arm 810 which is biased thereby so as to be rotated counterclockwise as seen from above the lock arm 810.

An engaging pawl 811, which engages the engaging edge 821a of the engaging section 820, is formed at the left face of the rear end portion of the lock arm 810, and a push section 812, which protrudes obliquely towards the right and forwardly, is formed at the front end portion of the lock arm 810. The engaging pawl 811 has an engaging face 811a, which extends virtually horizontally, and an inclined face 811b, which extends obliquely towards the left and rearwardly from the left end of the engaging face 811a.

Of the guide portions 513 of the optical pickup 500, the lower guide portion 513 serves as unlocking means.

As the drawer section 300 is pushed into the outside housing 200, the inclined face 811b of the engaging pawl 811 of the lock arm 810 comes into contact with the right side face of the inclined portion 822 of the engaging section 820, and is pushed towards the right by the right side face of the inclined section 822. The lock arm 810, along with the drawer section 300, moves towards the back side of the outside housing 200, while it rotates slightly clockwise. Thereafter, at the same time that the drawer section 300 reaches its housed position, the engaging face 811a of the lock arm 810 arrives at a location corresponding to the location of the engaging edge 821a of the engaging section 820. Therefore, the lock arm 810, as a result of being biased, rotates counterclockwise, as seen from above the lock arm 810, whereby the engaging face 811a of the lock arm 810 engages the engaging edge 821a of the engaging section 820. This causes the drawer section 300 to be locked at the housed position.

A description will now be given of how the above-described locking mechanism 800 is unlocked.

Figure 33:
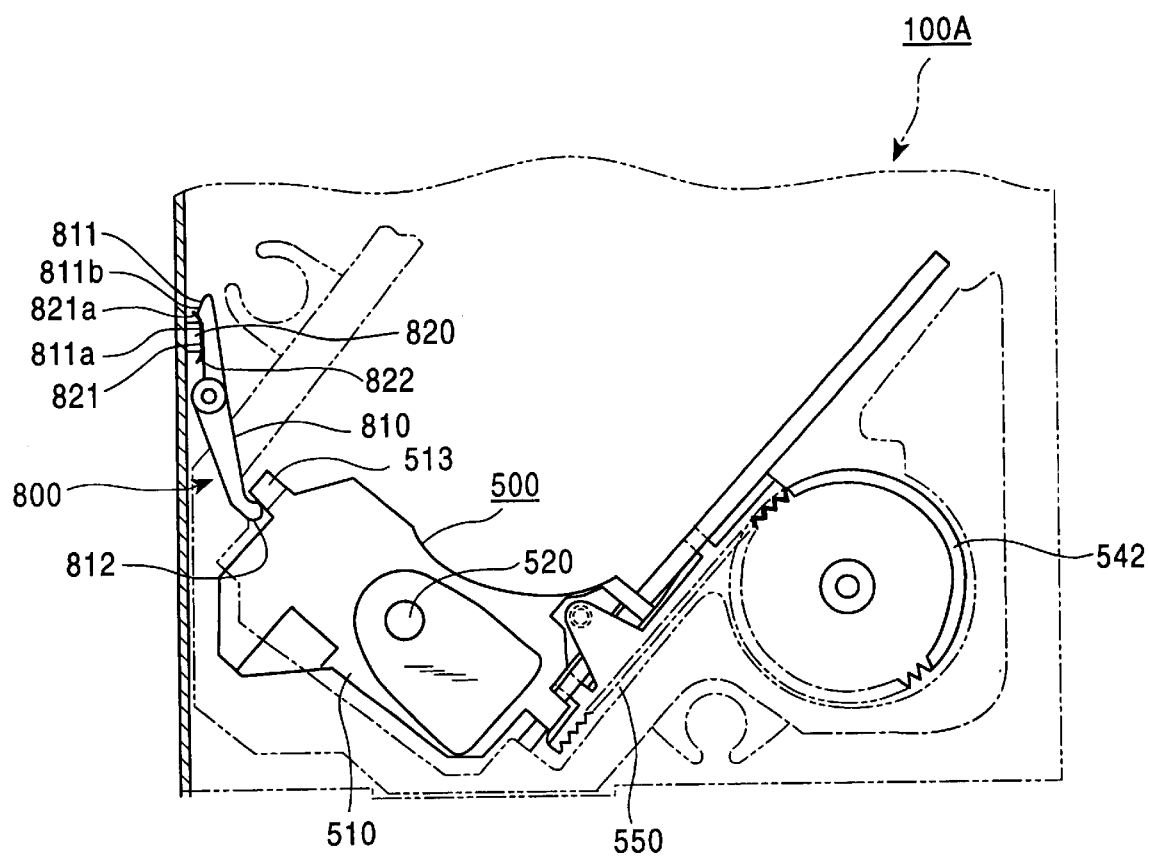
FIG. 33, which along with FIG. 34 shows a third embodiment of the disk drive in accordance with the present invention, is a plan view showing the optical pickup being positioned at the outermost periphery of the information recording area of the CD-ROM.
Figure 34:
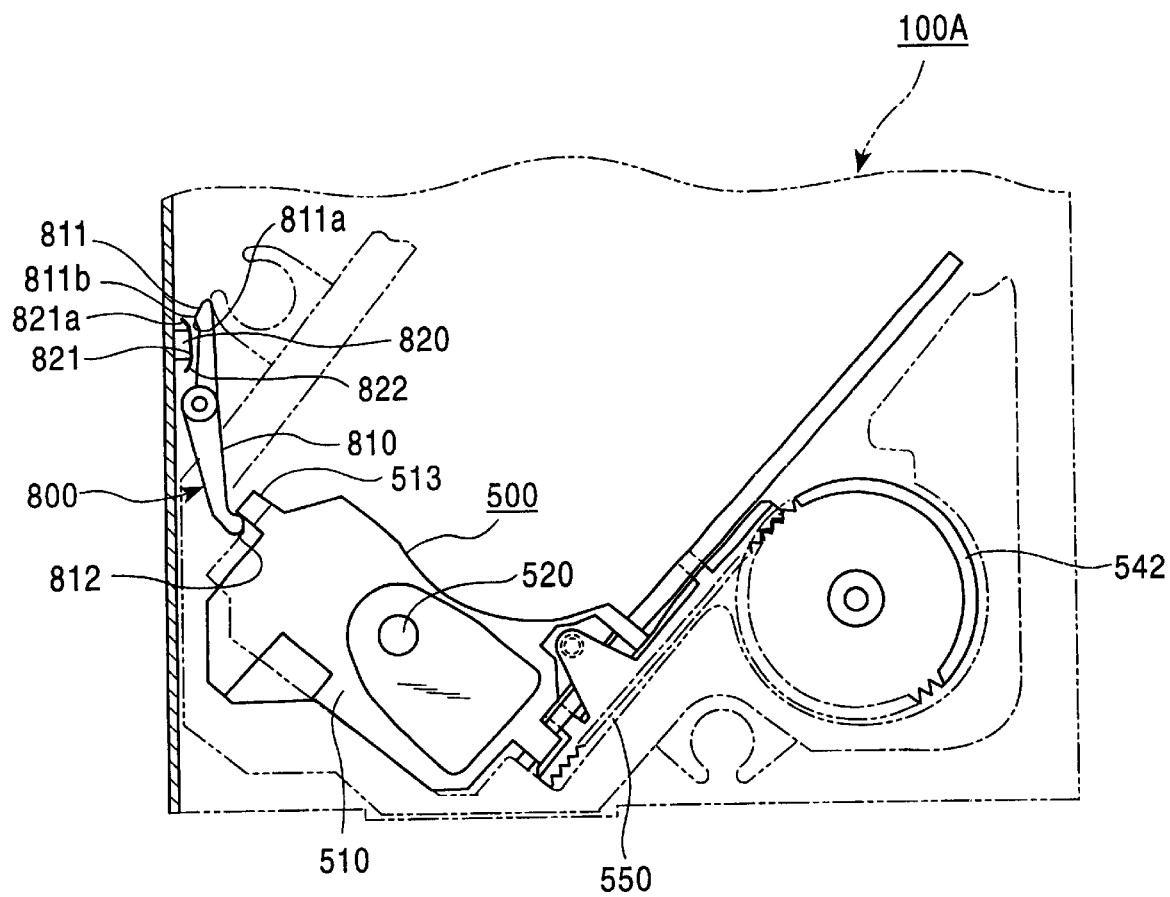
FIG. 34 is a plan view showing the optical pickup being positioned outwardly of the outermost periphery of the information recording area of the CD-ROM.

As shown in FIG. 33, when the optical pickup 500 is positioned at the outermost periphery of an information recording area of the CD-ROM on a turntable 420, a guide portion 513, at the lower side of the optical pickup 500, is positioned near the back side of a push section 812 of the lock arm 810. Therefore, when the optical pickup 500 is reading information carried by a signal from the CD-ROM, the movement of the optical pickup 500 in no way affects the locking operation of the locking mechanism 800 which locks the drawer section 300 at the housed position.

Pressing an eject button 322 on a front panel 320 causes a sled motor 540 to rotate further in the counterclockwise direction from its location of FIG. 33, causing the optical pickup 500 to move outwardly of the outermost periphery of the information recording area of the CD-ROM 600. During this time, when the guide portion 513, at the lower side of the optical pickup 500, pushes the push section 812 of the lock arm 810, the lock arm 810 rotates clockwise, as seen from above the lock arm 810 (refer to FIG. 34).

When the lock arm 810 rotates clockwise, the engaging face 811a thereof rotates towards the right and disengages from the engaging edge 821a of the engaging section 820, so that the drawer section 300, which has been locked at the housed position by the lock mechanism 811a, is unlocked. Unlocking the lock mechanism 800 causes the front end of the drawer section 300 to protrude from the outside housing as a result of the action of the extension coil spring 317a.

During this time, the clockwise rotation of the sled motor 540 causes the optical pickup 500 to move to, for example, a location corresponding to the innermost periphery of the information recording area of the CD-ROM 600, that is to a location where TOC of the CD-ROM can be read. This causes the guide portion 513, at the lower side of the optical pickup 500, to separate from the back side of the push section 812 of the lock arm 810, as a result of which the lock arm 810 that is biased by the tension coil spring rotates back to its original position, that is to the location where the engaging face 811a of the engaging pawl 811 can engage the engaging edge 821a of the engaging section 820 of the outside housing 200. Therefore, when the drawer section 300 is pushed into the outside housing 200, the locking mechanism locks the tray 310 completely accommodated in a main space 230 of the outside housing 200.

As can be understood from the foregoing description, according to the disk drive of the present invention, the unlocking means (the unlocking arm in the first embodiment, and the guide portion 513, at the lower side of the optical pickup 500, in the third embodiment) which operates as a result of driving power of the sled motor 540 unlocks the locking mechanism which has been locking the tray 310 completely housed in the outside housing 200, thereby making it unnecessary to provide a drive source which is designed specifically for unlocking the locking mechanism.

For this reason, it is not necessary to provide space for a drive source which is designed specifically for performing an unlocking operation, thereby reducing the size of the disk drive, and, particularly, making it easier to reduce the thickness of the disk drive and allowing use of fewer parts.

In the case where a solenoid or the like is used, it is possible to prevent the locking mechanism to be unlocked unexpectedly due to shock, thereby ensuring locking of the tray at its housed position.

Although in each of the above-described embodiments the locking mechanism is unlocked when the optical pickup 500 moves outwardly of the outermost periphery of the information recording area of the CD-ROM 600, the present invention is not limited thereto. Therefore, in other embodiments the locking mechanism may be unlocked when the optical pickup moves inwardly of the innermost periphery of the information recording area of the CD-ROM.

In addition, although in the foregoing description the present invention was applied to a CD-ROM drive, it may be applied to other types of disk drives in other embodiments.

What is claimed is:

1. A disk drive, comprising:

a turntable assembly having a base, a turntable for holding and rotating a disk, and first and second guide members attached to the base, wherein said first guide member is formed as a rod and said second guide member is formed of folded sheet metal;

a pickup, which is mounted on said turntable assembly, for reading information from the disk and/or recording information carried to the disk by moving in a radial direction of the disk and being guided along said first and second guide members; and a feed motor for moving said pickup and including a drive gear section that engages a rack of said pickup and a rotor, said drive gear section formed integrally with and integrally rotating with said rotor of said feed motor.

2. A disk drive according to claim 1, further comprising a tray for holding the disk being movable between a location where said tray is drawn out from an outside housing and a location where said tray is housed in said outside housing, wherein said first and second guide members are in a plane parallel to a plane of the disk held on said turntable and are arranged at an angle with respect to a direction of movement of said tray.

3. A disk drive according to claim 1, wherein while said pickup moves from an inner periphery to an outer periphery of an information recording area of the disk, said drive gear section is positioned at about a center of a range of movement of said rack.

* * * * *